US007585013B2

(12) United States Patent
Brown et al.

(10) Patent No.: US 7,585,013 B2
(45) Date of Patent: Sep. 8, 2009

(54) INTEGRATED HINGE AND TEMPORARY DOOR CHECKER

(75) Inventors: Mark Brown, Bellefontaine, OH (US); Marc Iman, Plain City, OH (US); Cindy Tran, Plain City, OH (US); James Ritchie, Columbus, OH (US); Ohno Takahiro, Wako (JP); Ogawa Takashi, Wako (JP); Ishikawa Takeshi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 12/234,092

(22) Filed: Sep. 19, 2008

(65) Prior Publication Data

US 2009/0015036 A1 Jan. 15, 2009

Related U.S. Application Data

(62) Division of application No. 11/094,996, filed on Mar. 31, 2005, now Pat. No. 7,430,785.

(51) Int. Cl.
*B60J 5/00* (2006.01)

(52) U.S. Cl. .................................. 296/146.11; 16/86 C

(58) Field of Classification Search ............ 296/146.11, 296/146.1, 146.9; 16/321, 344, 374, 335, 16/371
See application file for complete search history.

(56) References Cited

U.S. PATENT DOCUMENTS

| | | | | | |
|---|---|---|---|---|---|
| 2,176,641 | A | * | 10/1939 | Schonitzer | 16/86 C |
| 2,219,800 | A | * | 10/1940 | Allen | 16/86 C |
| 2,268,976 | A | * | 1/1942 | Westrope | 16/86 C |
| 2,314,416 | A | | 3/1943 | Muldoon | |
| 2,441,600 | A | * | 5/1948 | Schonitzer | 16/327 |
| 2,720,673 | A | * | 10/1955 | Wise | 16/82 |
| 3,710,417 | A | | 1/1973 | Berman et al. | |
| 3,729,772 | A | | 5/1973 | Marchione | |
| 4,285,098 | A | | 8/1981 | Hicks et al. | |
| 4,301,570 | A | | 11/1981 | Thomas | |
| 4,731,904 | A | | 3/1988 | Sprague | |
| 4,807,331 | A | | 2/1989 | Calucci | |
| 4,932,101 | A | | 6/1990 | Lualdi | |
| 5,475,897 | A | | 12/1995 | Satoh et al. | |
| 5,924,170 | A | | 7/1999 | Papke et al. | |
| 6,332,243 | B1 | | 12/2001 | Kim | |
| 6,334,236 | B1 | | 1/2002 | Kalliomaki | |

(Continued)

FOREIGN PATENT DOCUMENTS

WO WO 2004/027190 4/2004

*Primary Examiner*—Kiran B. Patel
(74) *Attorney, Agent, or Firm*—Rankin, Hill & Clark LLP; Vincent Ciamacco

(57) ABSTRACT

A temporary checking device is provided that works in conjunction with elements of a vehicle hinge that remain in the vehicle's final configuration. The hinge includes a hinge pin rotatably connecting a door hinge bracket to a pillar hinge bracket. The checking device includes a spring portion that is disposed between the door hinge bracket and the pillar hinge bracket. The spring portion is compressed during movement of the door hinge bracket relative to the pillar hinge bracket from either of two rest positions. The spring portion urges the vehicle door affixed thereto back into one of the rest positions, thus allowing manufacturing operations such as painting, etc., to be performed on the vehicle.

9 Claims, 9 Drawing Sheets

U.S. PATENT DOCUMENTS

| | | | | |
|---|---|---|---|---|
| 6,438,794 | B2 | 8/2002 | Ng et al. | |
| 6,481,056 | B1 | 11/2002 | Jesse | |
| 6,591,451 | B2 | 7/2003 | Gruber et al. | |
| 7,076,836 | B1 * | 7/2006 | Butka | 16/342 |
| 7,469,446 | B1 * | 12/2008 | Brown et al. | 16/334 |
| 2003/0140455 | A1 | 7/2003 | Audisio | |

* cited by examiner

INTEGRATED HINGE AND TEMPORARY DOOR CHECKER

CROSS REFERENCE TO RELATED APPLICATION

The disclosure of U.S. patent application Ser. No. 10/878,897, filed Jun. 28, 2004 is expressly incorporated herein by reference in its entirety.

BACKGROUND OF THE INVENTION

During the manufacture and assembly of vehicles, it is often necessary to perform certain operations with the vehicle body and doors assembled. Automated application of sealer to body joints and door joints and painting of the vehicle are examples of such operations. Concurrent door and body painting provides uniform color and quality between the body and doors. During the sealing and painting operations, the vehicle door must be opened and closed numerous times. Because the painting, etc. is often performed by automated systems, position and repeatability of locating the doors is of primary importance.

Door hinges used on the finished vehicle may also be used during these intermediate assembly steps such as painting. However, the permanent door checking devices used on the finished vehicle typically are not in place during these intermediate steps because they can be damaged by the harsh environment in paint operations (ovens, paint, use of electrostatic equipment, solvents, and/or preparatory cleaners). As a substitute, temporary door checking devices are used to hold doors in desired positions during these intermediate steps. Typically, a temporary checking device is affixed to the door and vehicle body before the operation begins and removed after the operation is complete and often reused. The temporary checking device may be positioned at the same location in which the permanent door checking device used on the finished vehicle will be placed.

Because most temporary checking devices are self contained, requiring nothing except a place to be mounted, they tend to be relatively complex and time consuming to install and remove. This increases overall vehicle manufacturing costs. What is desired is a temporary checking device that works in conjunction with elements already in place on the vehicle, the temporary checking device being simple and easily installed and removed.

SUMMARY OF THE INVENTION

The present invention provides an improvement over the prior art by providing a temporary checking device that works in conjunction with elements of a vehicle hinge that will remain in the vehicle's final configuration. Moreover, the checking device is simpler and more easily installed and removed than checking devices known in the art.

In accordance with the present invention, a hinge system is provided that includes a hinge pin, a door hinge bracket receiving the hinge pin, a pillar hinge bracket also receiving the hinge pin, and a checking device removably secured to the door hinge bracket and pillar hinge bracket. The door hinge bracket is rotatably movable with respect to the pillar hinge bracket.

In accordance with one embodiment of the invention, the checking device includes a generally U-shaped spring that is expanded or compressed during relative movement between the door hinge bracket and pillar hinge bracket from either of two rest positions (e.g. a door open position and door closed position). The spring urges the hinge, and the vehicle door affixed thereto, back into one of the rest positions and thereby holds the door in either one of a full-open or a full-closed position. The temporary checking device includes two projections integrally formed with and protruding from the spring and is detachably affixed to the door hinge bracket and pillar hinge bracket by manual insertion of the projections into holes in the respective brackets. Following completion of the assembly or manufacturing operations requiring movement of the door between the open and closed positions, the checking device may be simply pulled out of the hinge brackets.

In according with another embodiment of the invention, the checking device includes a pin portion and a spring portion. The pin portion extends through the pillar hinge bracket, while the spring portion extends from the pin portion and is secured to the door hinge bracket.

In further accordance with the present invention, the pin portion includes first, second and third segments, with the first segment extending into an upper mounting hole formed in the pillar bracket, and the third segment extending through a lower mounting hole in the pillar bracket. The second segment is disposed between the first and third segments. The pin segments have a diameter that increases from the first to the third pin segments.

The spring portion includes first and second U-shaped portions, and has a first end that is integrally connected to the third segment, on one end, and received by the door hinge bracket, at an opposite end. The spring portion also includes a linear segment interconnecting or disposed at the union of the first and second U-shaped portions. The linear segment engages the pillar hinge bracket when the door is in an open position The present invention further provides a method for installing door checking devices on front and rear doors of a vehicle and for removing installed door checkers from the front and rear doors of a vehicle in a simple and time saving operation. In accordance with the present invention, the checking devices are installed by opening the front door in order to gain access to the front and rear door hinge assemblies, and installing the front checking device on the front door hinge assembly and installing the rear door hinge assembly. Installation may be accomplished at one assembly location and without opening the rear door, greatly increasing productivity. Similarly, removal of the checking devices is accomplished by opening the front door in order to gain access to the front and rear door hinge systems, which include the checking devices, and thereafter removing the front checking device from the front door hinge system and removing rear checking device from the rear door hinge system. Removal of the checking devices may be accomplished at one assembly location and without opening the rear door, greatly increasing productivity

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
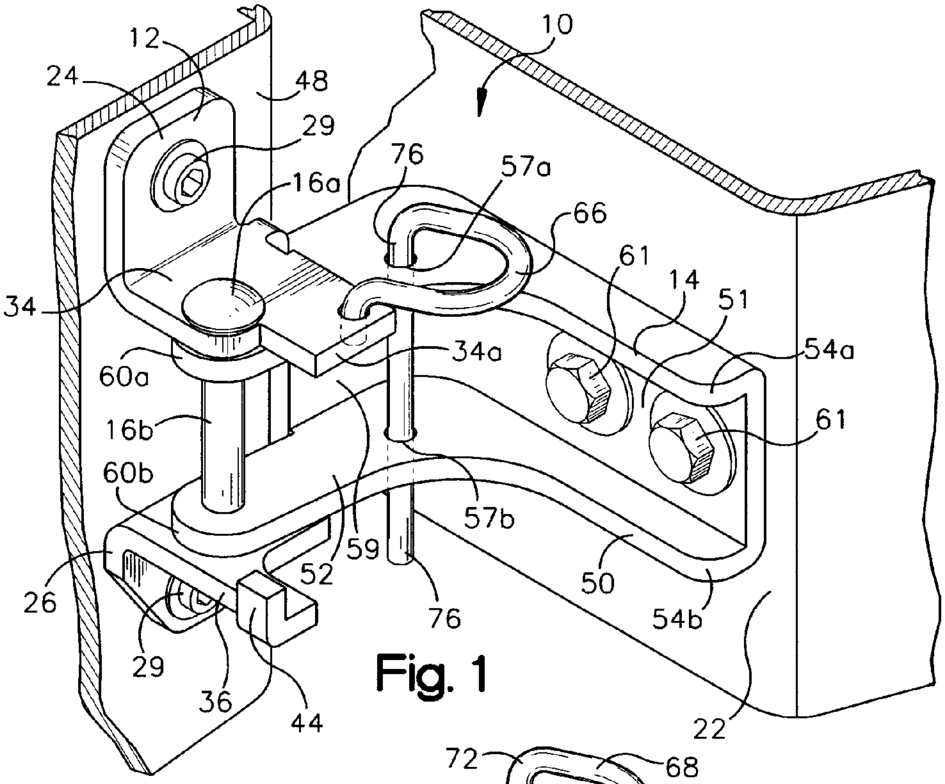
FIG. 1 is a view from the front and right side (passenger side) of the vehicle of a first embodiment of the hinge system of the present invention.

Referring generally to FIGS. 1-3C, a first embodiment of a hinge system according to the present invention is shown. The hinge system 10 includes a door hinge bracket 12, a pillar hinge bracket 14, a hinge pin 16, and a checking device (temporary door checker) 18. As will be appreciated from the following, the illustrated first embodiment depicts a hinge system 10 installed on a vehicle front door. Naturally, those skilled in the art will recognize that slight modification of the hinge brackets will be necessary to use the hinge system 10 on a vehicle rear door.

Preferably, the hinge system 10 is used as both an upper hinge and a lower hinge to pivotally secure a door 48 to a vehicle body. Alternatively, the hinge system 10 may be used as one of the hinges (i.e., upper or lower hinge), while the other hinge is substantially identical, but without the checking device.

The door hinge bracket 12 is rotatably secured to the pillar hinge bracket 14 via the hinge pin 16 and the angular orientation of the door hinge bracket 12 and the door 48 secured thereto may be checked or releasably maintained in two positions, either full-open or full-closed, via operation of the checking device 18, as described hereinafter. It is further noted that although the hinge system 10 is described hereinafter as including the door checking device 18, the hinge system 10 is fully functional as a hinge following removal of the checking device 18, 118.

The hinge system 10 is adapted for use during intermediate vehicle assembly and especially during a painting operation wherein the doors 48 must be moved between a full-closed position (i.e., first angular orientation relative to the vehicle body) and a full-open position (i.e., second angular orientation relative to the vehicle body). While in the first embodiment it is preferred that the doors are maintained in either the full-open or full-closed positions, the present invention can be used to maintain the doors in positions that are not literally 'full-open' or 'full-closed'. By adjusting the pin configuration, the present invention may be used to releasably hold the vehicle doors in positions other than strictly 'full-open' or 'full-closed'. As will be appreciated by those skilled in the art, adjustment of the door checker 18 mounting locations relocates the positions where the spring is in a neutral state (i.e. neither compressed or expanded) that are, in turn, positions to which the door is biased by a spring portion 66 of the checking device 18.

Figure 2:
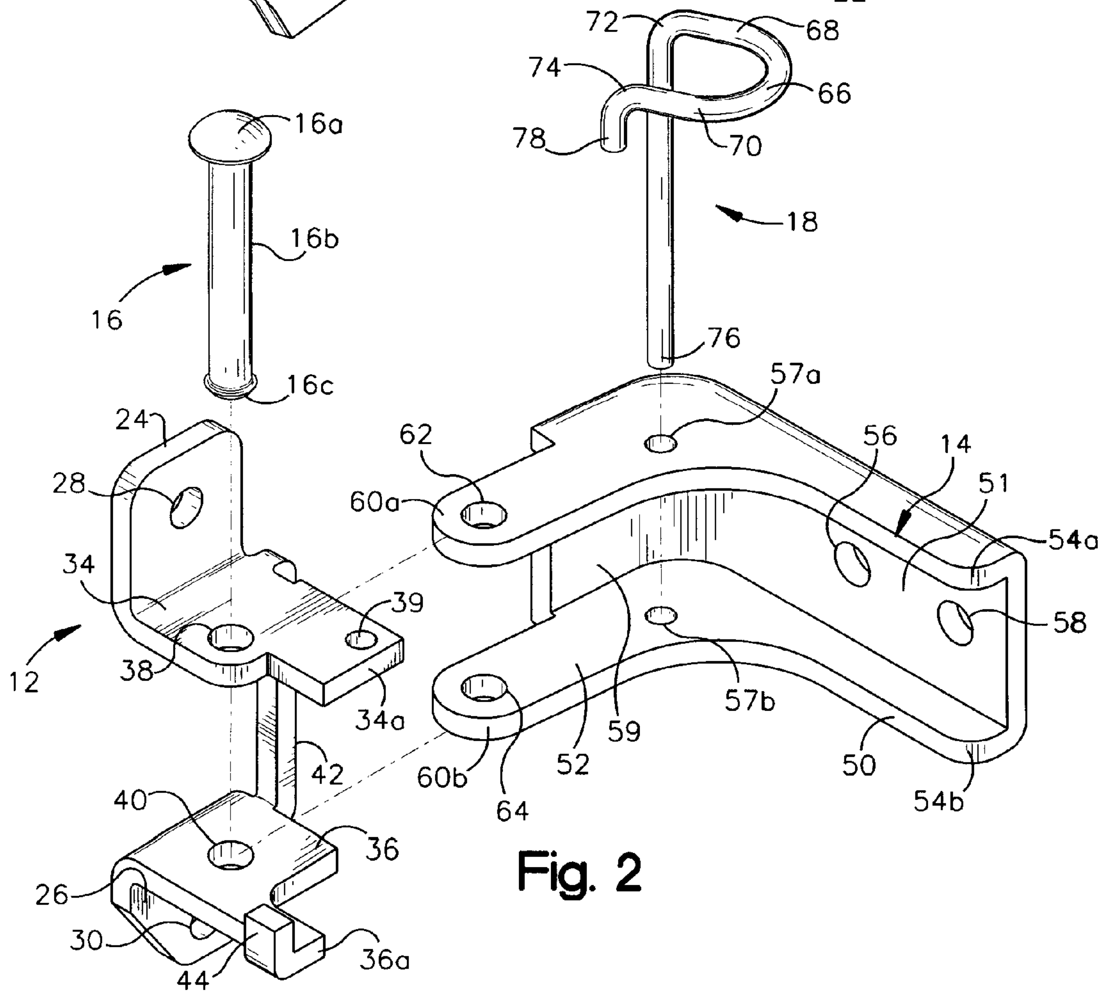
FIG. 2 is an exploded view of the hinge system of FIG. 1.

As shown in FIGS. 1 and 2, the door hinge bracket 12 is affixable to a vehicle door 48 and includes a first or upper ear 24 extending vertically upward and a second or lower ear 26 extending vertically downward. Each ear 24, 26 defines a hole 28, 30 for the passage of a fastener 29 to affix the door hinge bracket 12 to the vehicle door 48.

Integrally formed with the first ear 24 and extending generally perpendicular thereto and away from the vehicle door 48 is a first or upper planar flange 34. Integrally formed with the second ear 26 and extending generally perpendicular thereto and away from the vehicle door 48 is a second or lower planar flange 36. Each flange 34, 36 defines a hole 38, 40 through which the hinge pin 16 extends.

The upper flange 34 of the door hinge bracket 12 includes an extending portion 34*a* that extends outwardly opposite the first ear 24. A mounting hole 39 is formed in the extending portion 34*a* of the upper planar flange 34 at a position outwardly spaced from the vehicle door 48. Although referred to as a hole herein, mounting hole 39 may, rather, be a detent or blind bore able to receive an inserted part, as a result the part does not pass through such that it could interfere with rotation of the hinge.

A bridge member 42 extends between the upper planar flange 34 and the lower planar flange 36, and thus serves as a spacer, a structural support, and a first rotational stop. The bridge member 42 protrudes from the upper planar flange 34 at a position adjacent the upper ear 24 and between a rear side of the pillar hinge bracket 14 and vehicle door 48 when the system is assembled. As will be discussed further hereinafter, the bridge member 42 engages the pillar hinge bracket 14 when the door 48 is in the closed position.

Figures 3A, 3B, 3C:
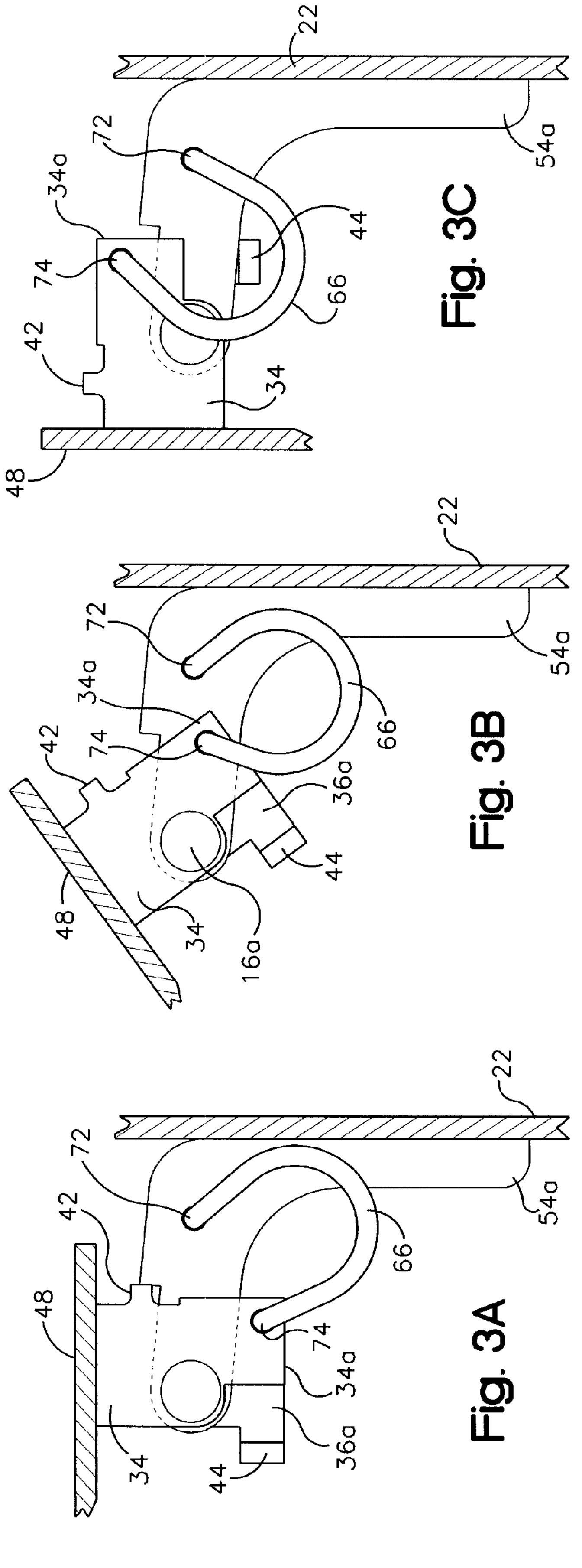
FIG. 3A is a top partial cross-sectional view illustrating a portion of the hinge system of FIG. 1 in the first angular orientation in which a door supported by the hinge system is closed.
FIG. 3B is a top partial cross-sectional view illustrating a portion of the hinge system of FIG. 1 in an intermediate position between the first and second angular orientations.
FIG. 3C is a top partial cross-sectional view illustrating a portion of the hinge system of FIG. 1 in the second angular orientation in which the door is open.

A projecting portion 36*a* extends outwardly from the lower flange 36 of the second ear. A tab 44 extends upwardly from a lateral edge of the projecting portion 36*a*, and serves as a second rotational stop. As will be discussed further hereinafter, the tab 44 engages the pillar hinge bracket 14 when the door 48 is in the open position. With reference to FIGS. 3A-3C, the extending portion 34*a* of upper flange 34 and the projection portion 36*a* of lower flange 36 extend outwardly an equal amount from the upper and lower ears 24, 26, respectively.

The pillar hinge bracket 14 of the hinge system 10 is affixable to a vehicle pillar 22. The pillar hinge bracket 14 is generally L-shaped and includes a pillar flange 50 and a pin bracket 52. The pillar flange 50 has a generally planar base wall 51 from which upper and lower raised peripheral walls 54*a*, 54*b* extend. The pillar flange 50 defines two holes 56, 58 for the passage of fasteners 61 that affix the pillar hinge bracket 14 to the vehicle pillar 22.

The pin bracket 52 is oriented generally perpendicular to the pillar flange 50 and includes a base wall 59 and upper and lower raised peripheral walls 60*a*, 60*b*. The base wall 59 of the pin bracket 52 integrally extends from the base wall 51 of the pillar flange 50. The upper and lower raised peripheral walls 60*a*, 60*b* of the pin bracket 52 integrally merge with the upper and lower raised peripheral walls 54*a*, 54*b*, respectively, of the pillar flange 50, as illustrated, so as to define upper and lower L-shaped walls.

Preferably, the pin bracket base wall 59 is shorter in length than the pin bracket peripheral walls 60*a*, 60*b* such that the pin bracket peripheral walls 60*a*, 60*b* extend past the end of the pin bracket base wall 59, as illustrated.

Each of the upper and lower pin bracket peripheral walls 60*a*, 60*b* define a hole 62, 64 near their distal ends, as illustrated. When the hinge system 10 is assembled, the holes 62, 64 defined by the pin bracket peripheral walls 60*a*, 60*b* align with the holes 38, 40 formed in the upper and lower flanges 34, 36 of the door hinge bracket 12 and cooperate to receive the hinge pin 16.

Mounting holes 57*a*, 57*b* for receipt of the checking device 18 are formed in the upper and lower pin bracket peripheral walls 60*a*, 60*b*. The mounting holes 57*a*, 57*b* are vertically aligned with each other and are disposed at the junction of the upper pin bracket peripheral wall 60*a* and upper peripheral wall 54*a* and lower pin bracket peripheral wall 60*b* and lower peripheral wall 54*b*, respectively, as illustrated.

The mounting holes 39 and 57*a*, 57*b* are preferably located in positions that do not structurally affect the door hinge bracket 12 or pillar bracket 14 in a detrimental manner. Additionally, the mounting holes 39 and 57*a* are positioned such that the distance therebetween is equal at two distinct positions or rotational orientations (e.g. when the door is full-open and full-closed). As a result, the position of greatest spring compression of the checking device 18 is an intermediate point between these two distinct positions (e.g., half-closed), as will be apparent from the following discussion.

It is contemplated that the mounting hole 39 in the door hinge bracket 12 and/or the mounting holes 57*a*, 57*b* in the pillar bracket 14 may be moved to different positions. Relocating the mounting holes may be desired to change the position of maximum spring force during movement of the vehicle door 48, the positions when the spring is in a neutral state, or for other reasons.

The hinge pin 16 includes an enlarged upper head 16*a*, a cylindrical body 16*b*, and a swaged lower head 16*c*. The hinge pin 16 has a length, and the cylindrical body 16*b* has a diameter, so as to permit the hinge pin 16 to extend through the aligned holes 38, 62, 64, 40 in the pillar bracket 14 and the door bracket 12, respectively.

Referring back to FIGS. 1-2, in the first embodiment of the invention the upper flange 34 of the door hinge bracket 12 is disposed above the upper peripheral wall 60*a* of the pillar hinge bracket 14 and the lower flange 36 of the door hinge bracket 12 is disposed below the lower peripheral wall 60*b* of the pillar hinge bracket 14. As such, the enlarged upper head 16*a* of the hinge pin 16 rests upon the upper flange 34 of the door hinge bracket 12, the body 16*b* passes through the holes 38, 62, 64, 40, and the swaged lower head 16*c* (which is formed by known riveting or heading techniques on the lower end of the pin body 16*b*), is downwardly adjacent the lower flange 36 of the door hinge bracket 12. The hinge pin 16 is held in place and cannot be removed without destroying the hinge pin 16 and/or one of the hinge brackets 12, 14.

In FIG. 2, the hinge system 10 is shown in an exploded view, including the temporary checking device 18 of the first embodiment. The checking device 18, shown in FIGS. 2 and 3A-3C, includes a U-shaped spring 66 from which first and second posts 76, 78 integrally extend. The spring 66 defines a plane that is oriented generally parallel to the upper and lower flanges 34, 36 of the door hinge bracket 12 and generally perpendicular to the pillar 22.

The spring 66 has first and second integrally formed arc-shaped sections 68, 70 extending to first and second ends 72, 74, respectively. The first post 76 extends integrally and downwardly from the first spring end 72 while the second post 78 extends integrally and downwardly from the second spring end 74.

The first post 76, which is substantially longer than the second post 78, extends perpendicularly from the spring plane and is configured to extend through the mounting holes 57*a*, 57*b* in the pillar bracket 14. The second post 78 also extends perpendicularly from the spring plane and is configured to extend into, and possibly through, the mounting hole 39 in the door hinge bracket 12, but not so far as to interfere with the movement of the door hinge bracket upper flange extending portion 34*a* over the upper pin bracket peripheral wall 60*a*.

After full installation of the checking device 18 into the door and pillar hinge brackets 12, 14, the first spring end 72 is directly adjacent to the mounting hole 57*a* and the second spring end is directly adjacent to the mounting hole 39 in the door hinge bracket 12.

As will be discussed more fully hereinafter, placement and removal of the door checking device 18 into the respective mounting holes 39, 57*a*, 57*b* is performed manually, either by hand or with the aid of a tool. Preferably, the spring 66 is in an unstressed condition during insertion and removal. However, it is contemplated that the spring 66 may be under compression or tension during insertion and removal, if desired.

The temporary door checking device 18 may be formed from any number of materials. Preferably, the checking device 18 is formed from a hardened and tempered metal material (i.e., steel, spring steel) which will provide a spring-like effect and thereby bias or urge the vehicle door into desired positions. It is currently believed that tempered spring steel material will be preferred for reasons of cost, durability, and ease of manufacture.

A spring force is generated if the ends 72, 74 of the spring 66 are moved relatively toward or away from each other. The force generated by compression and/or expansion of the spring 66 biases or urges the door 48 to a rest position (e.g., either full-open or full-closed) and, in use, the checking device 18 serves to releasably retain the vehicle door 48 in any one of two angular orientations (e.g. full-open or full-closed) relative to the host vehicle (e.g., compare FIGS. 3A and 3C).

FIG. 3A shows the vehicle door 48 in a full-closed position and the spring 66 in a neutral state. FIG. 3B shows the door 48 in a half-closed position in which the spring 66 is at maximum compression. FIG. 3C shows the door 48 in a full-open position in which the spring 66 is again in a neutral state.

As will be apparent to those skilled in the art, should the door 48 be between the full-closed position (FIG. 3A) and the half-closed position (FIG. 3B), the spring 66 will urge the door 48 toward the closed position. On the other hand, should the door 48 be between the full-open position (FIG. 3C) and the half-closed position (FIG. 3B) the spring will urge the door toward the full-open position.

Further, by comparing FIG. 3A to FIG. 3C, it is seen that the spring ends 72, 74 are at a first distance from one another, whereas in FIG. 3B the spring ends 72, 74 are at a second, smaller distance from one another. Preferably, rotation of the door 48 from the full-open or full-closed position toward the half-closed position compresses the spring 66 and thereby generates a spring force sufficient to return the door 48 to either the full-open or full-closed position, depending upon the orientation or position of the door relative to the half-closed position. Insofar as, during manufacture, the door 48 is pivoted between the full-open and full-closed positions by mechanical actuators, and then released, it is important that the door not only reach the desired orientation, but that means are provided to hold the door in the desired orientation. Accordingly, the hinge system 10 incorporating the checking device 18 of the first embodiment of the present invention reliably and repeatedly returns the door 48 to only either the full-open or full-closed positions, as desired, and holds the door in the desired orientation.

In the first embodiment, the door checking device 18 may be inserted into the hinge system 10 either before or after mounting of the hinge brackets to the door 48 and pillar 22. Preferably, the door checking device 18 is installed on the assembled hinge system 10 and then the assembled hinge system 10 with the associated door checking device 18 is mounted to the vehicle. Thereafter, during intermediate vehicle assembly operations in which the door must be reliably and repeatedly positioned in either the full-open or full-closed positions, the door checking device 18 serves to conveniently urge the door into the desired position and hold the door in the desired position.

When checking of the door position is no longer desired, such as at the end of the painting operations, the first embodiment of the checking device 18 may be removed from the hinge system 10 simply by pulling the checking device 18 out of the mounting holes, while the remainder of the hinge system 10 remains in place. The hinge system 10 less the checking device 18 is the final hinge system and is used throughout the life of the vehicle to pivotally secure the door to the vehicle body.

The spring 18 has been described as being U-shaped, but may be made in different shapes and/or sizes and/or thicknesses in order to generate more spring force and/or to avoid interference with other components of the hinge or vehicle. In one example, the spring has a box shape with one open end.

A front door hinge system 110 according to a second embodiment of the present invention is illustrated in FIGS. 4, 5, 8, 9, 12, 13A, 13B, 15A, and 15B. A rear door hinge system 210 according to the second embodiment of the present invention is illustrated in FIGS. 6, 7, 10, 11, 14A, 14B, 16A and 16B. Procedures for installation, use, and removal of a temporary front checking device 118, 218 according the second embodiment are described hereinafter with reference to FIGS. 17A-17C.

The second embodiment of the hinge system 110, 210 shares many structural components and operating characteristics with the first embodiment, described hereinbefore. Such common structural components and operating characteristics will not be discussed in detail hereinafter.

Figure 4:
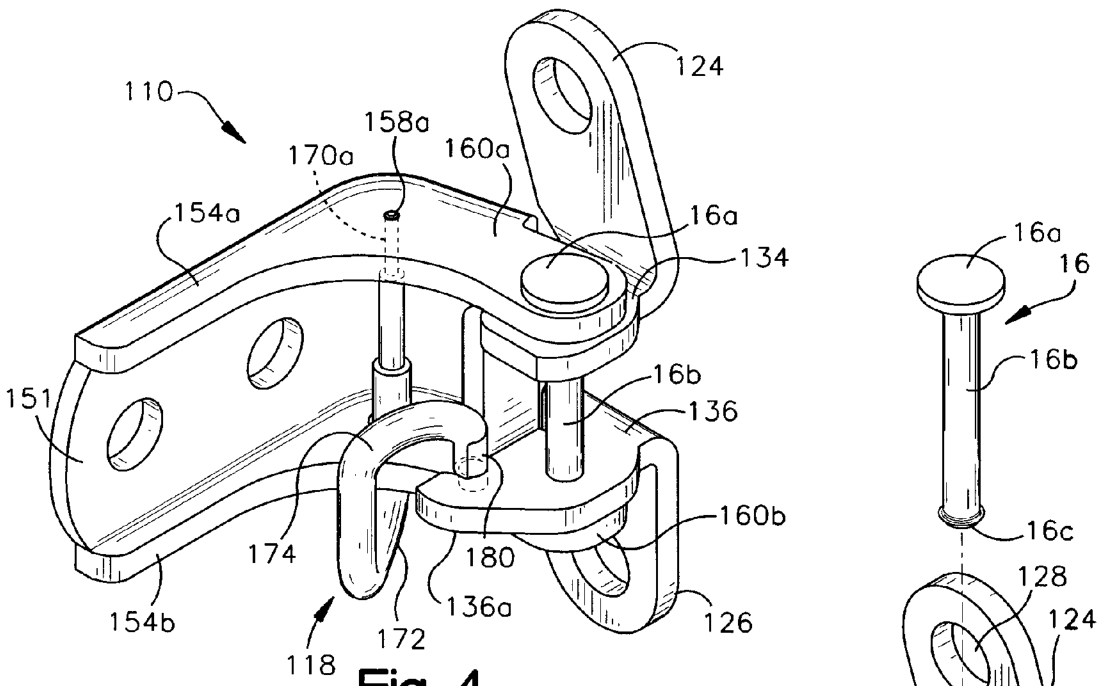
FIG. 4 is a perspective view of a front door hinge system according to a second embodiment of the present invention.
Figure 5:
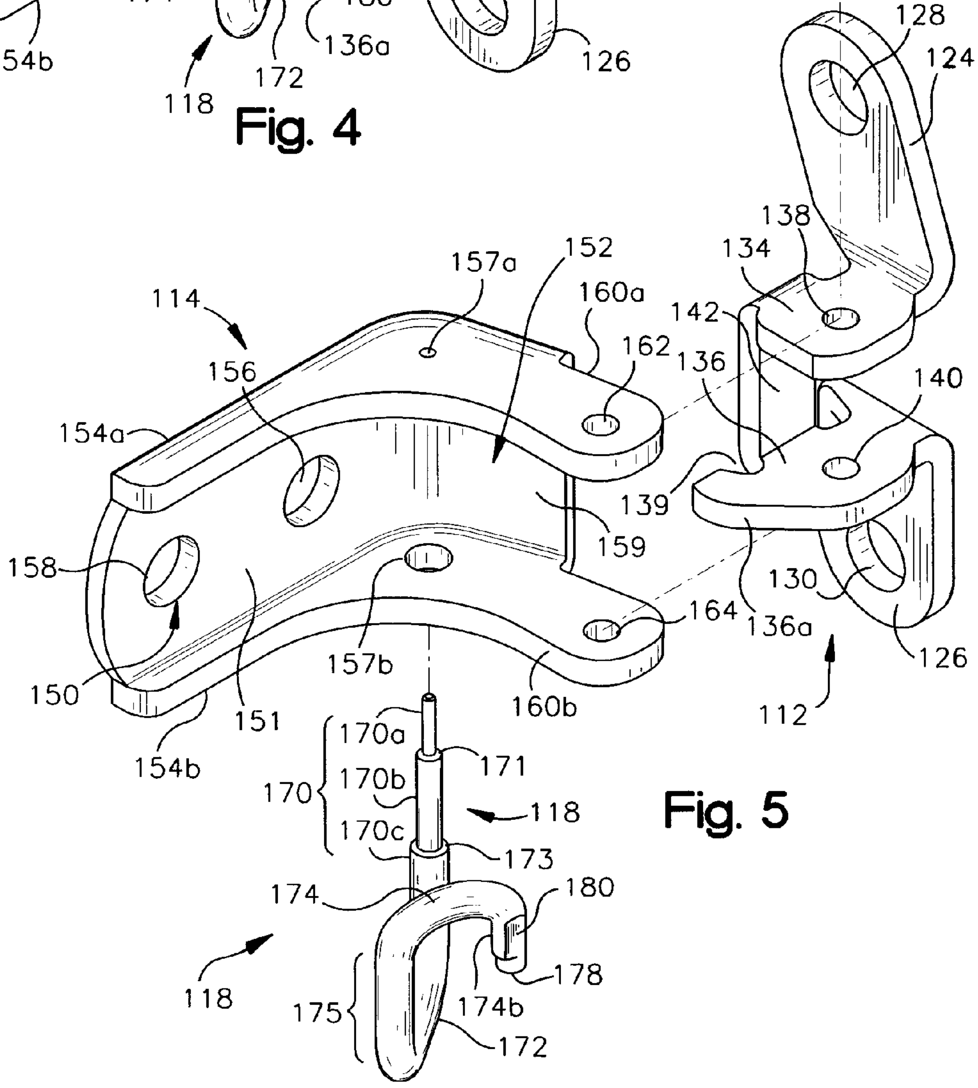
FIG. 5 is an exploded view of the front door hinge system of FIG. 4.

FIG. 4 shows the front door hinge system 110 in an assembled condition wherein a front door hinge bracket 112 is pivotally secured to a front pillar hinge bracket 114 via the hinge pin 16, and wherein the front checking device 118, described hereinafter, is inserted into the front hinge brackets 112, 114. FIG. 5 shows the front hinge system 110 in an exploded condition.

With reference to FIGS. 4, 5, 8 and 9, the front door hinge bracket 112 is affixable to a vehicle front door 148 and includes a first or upper ear 124 extending vertically upward and a second or lower ear 126 extending vertically downward. Each ear 124, 126 defines a hole 128, 130 for the passage of a fastener to affix the front door hinge bracket 112 to the vehicle front door 148.

A first or upper planar flange 134 is integrally formed with the first ear 124 and extends generally perpendicular thereto and away from the vehicle front door 148. A second or lower planar flange 136 is integrally formed with the second ear 126 and extends generally perpendicular thereto and away from the vehicle front door 148. Each flange 134, 136 defines a hole 138, 140 through which the hinge pin 16 extends.

The lower flange 136 of the door hinge bracket 112 includes an extending portion 136*a* that extends outwardly opposite the second ear 126. A mounting recess 139 is formed in a lateral surface of the extending portion 136*a* at a position outwardly spaced from the vehicle door 148. As will be appreciated, the mounting recess 139 is formed in a surface of the extending portion 136*a* that faces toward the vehicle front pillar 122, described hereinafter. Preferably, the mounting recess 139 is semi-circular or arcuate in shape, and is sized to positively receive a lower portion (referred to hereinafter as the mounting projection 178) of the front checking device 118, described hereinafter. Naturally, the mounting recess 139 may, instead of curved or arcuate, have any other peripheral shape that is desired.

A bridge member 142 extends between the upper and lower flanges 134, 136, and thus, serves as a structural support. The bridge member 142 protrudes from the upper planar flange 134 at a position adjacent the upper ear 124 and between a rear side of the front pillar hinge bracket 114 and vehicle front door 148 when the system 110 is assembled. It is noted that the bridge member 142 is spaced slightly rearwardly (i.e., toward the front door 148) from the mounting recess 139.

The front pillar hinge bracket 114 of the hinge system 110 is affixable to a vehicle front pillar 122. The front pillar hinge bracket 114 is generally L-shaped and includes a pillar flange 150 and a pin bracket 152. The pillar flange 150 has a generally planar base wall 151 from which upper and lower raised peripheral walls 154*a*, 154*b* extend. The pillar flange 150 defines two holes 156, 158 that receive fasteners 161 to affix the front pillar hinge bracket 114 to the vehicle front pillar 122.

The pin bracket 152 is oriented generally perpendicular to the pillar flange 150 and includes a base wall 159 and upper and lower raised peripheral walls 160*a*, 160*b*. The base wall 159 of the pin bracket 152 integrally extends from the base wall 151 of the pillar flange 150. The upper and lower raised peripheral walls 160*a*, 160*b* of the pin bracket 152 integrally merge with the upper and lower raised peripheral walls 154*a*,

154*b*, respectively, of the pillar flange 150, as illustrated, so as to define upper and lower L-shaped walls.

Preferably, the pin bracket base wall 159 is shorter in length than the pin bracket peripheral walls 160*a*, 160*b* such that the pin bracket peripheral walls 160*a*, 160*b* extend past the end of the pin bracket base wall 159, as illustrated.

Each of the upper and lower pin bracket peripheral walls 160*a*, 160*b* define a hole 162, 164 near their distal ends, as illustrated. When the hinge system 110 is assembled, the holes 162, 164 defined by the pin bracket peripheral walls 160*a*, 160*b* align and cooperate with the holes 138, 140 formed in the upper and lower flanges 134, 136 of the front door hinge bracket 112 to receive the hinge pin 16.

An upper mounting hole 157*a* is formed in the upper pin bracket peripheral wall 160*a* and a lower mounting hole 157*b* is formed in the lower pin bracket peripheral wall 160*b*. The upper and lower mounting holes 157*a*, 157*b* are vertically aligned with each other. The upper mounting hole 157*a* is generally disposed at a junction of the upper pin bracket peripheral wall 160*a* and the upper peripheral wall 154*a*. The lower mounting hole 157*b* is generally disposed at a junction of the lower pin bracket peripheral wall 160*b* and the lower peripheral wall 154*b*, as illustrated. It will be appreciated that, while the upper and lower mounting holes 157*a*, 157*b* are preferably coaxial, a diameter of the upper mounting hole 157*a* is substantially smaller than a diameter of the lower mounting hole 157*b*, for purposes that will be apparent from the following description.

The mounting recess 139 and the mounting holes 157*a*, 157*b* of the hinge brackets 112, 114 cooperate to receive the front checking device 118, as described hereinafter. As in the first embodiment, the exact position of the mounting recess 139 and mounting holes 157*a*, 157*b* may be modified from that disclosed herein so as to provide the desired operating characteristics of the device. Moreover, the size and shape of the mounting recess 139 and mounting holes 157*a*, 157*b* are adapted to the particular checking device being used and, therefore, are not limited to those specifically described and illustrated herein. It is preferred, though not required, that mounting recess 139 and the mounting hole 157*b* are spatially positioned such that the distance therebetween is equal at two distinct rotary positions (e.g. first and second front door angular orientations shown in FIGS. 8 and 9) such that the position of greatest checking device spring compression is midway between the two distinct rotary positions (i.e., midway between the first angular orientation of FIG. 8 and the second angular orientation of FIG. 9).

It is noted that the position of the front door hinge bracket 112 relative to the front pillar hinge bracket 114 has changed as compared to the hinge brackets 12, 14 of the previously-described first embodiment. More specifically, in the second embodiment the upper flange 134 of the front door hinge bracket 112 is disposed below the upper peripheral wall 160*a* of the front pillar bracket 114 and the lower flange 136 of the front door hinge bracket 112 is disposed above the lower peripheral wall 160*b* of the front pillar bracket 114. As such, the hinge pin upper head 16*a* rests upon the upper peripheral wall 160*a* of the front pillar bracket 114, the hinge pin body 16*b* passes through the holes 162, 138, 140, 164, and the lower hinge pin head 16*c* is downwardly adjacent the lower peripheral wall 160*b* of the front pillar hinge bracket 114. As in the first embodiment, the hinge pin 16 is preferably held in place and cannot be removed without destroying the hinge pin 16 and/or one of the hinge brackets 112, 114.

In FIG. 5, the hinge system 110 is shown in an exploded form, including the front checking device 118. The checking device 118 includes a pin portion 170 and first and second U-shaped portions 172, 174. The U-shaped portions 172, 174 serve as a spring portion, as will be apparent from the following discussion.

The pin portion 170 includes first, second, and third coaxial segments 170*a*, 170*b*, 170*c* having first, second and third diameters, respectively, so as to define a first transition or step 171 between the first and second segments 170*a*, 170*b* and a second transition or step 173 between the second and third segments 170*b*, 170*c*.

The first segment 170*a* is at a distal end of the pin portion 170 and has the smallest diameter (i.e., between about 2 to 3 mm) of the pin portion segments. The first segment 170*a* of the pin portion 170 is adapted to be received by the upper mounting hole 157*a*, as will be described more fully hereinafter.

The second segment 170*b* integrally extends between the first and third segments 170*a*, 170*c*, and has a diameter that is relatively larger than that of the first segment 170*a* and relatively smaller than that of the third segment 170*c*. For example, the second segment diameter may be between about 4 to 5 mm. When the checking device 118 is installed in the hinge brackets 112, 114, the second segment 170*b* is disposed between the upper and lower peripheral walls 160*a*, 160*b* of the front pillar hinge bracket 114.

The third segment 170*c* integrally extends from the second segment 170*b* and integrally connects to an inner end of the first U-shaped portion 172. The third segment 170*c* has a diameter that is generally equal to the diameter of the U-shaped portions 172, 174 and generally larger than that of the first and second segments 170*a*, 170*b*. For example, the diameter of the third segment 170*c* may be between about 6 to 8 mm. When the door checking device 118 is installed in the hinge brackets 112, 114, the third segment extends through the lower mounting hole 157*b* that is formed in the lower peripheral wall 160*b* of the front pillar hinge bracket 114.

The first U-shaped portion 172 has a first or inner end integrally extending from the pin portion third segment 170*c*. The first U-shaped portion 172 extends away from the third segment 170*c* at an angle to the length of the pin portion 170. It will be appreciated that the first U-shaped portion 172 and the pin portion 170 cooperate to define a first plane.

The first U-shaped portion 172 has a second or outer end, remote from the pin portion 170, which integrally merges into a first end of the second U-shaped portion 174. The union of the first and second U-shaped portions defines a linear section 175 that is generally parallel to the pin portion 170. The second U-shaped portion 174 extends away from the plane defined by the first U-shaped portion 172 and the pin portion 170, and terminates in a downwardly directed second end 174*b* having a flattened or planar surface 180 and from which the mounting projection 178 extends. As will be discussed at length hereinafter, the flattened or planar surface 180 is provided to permit a desired range of motion for the front door 148 relative to the vehicle and to facilitate placement of the mounting projection 178 in close proximity to the bridge member 142. Further, and as will be clear from the following description, the mounting projection 178 has a reduced diameter as compared to the second U-shaped portion 174 and is adapted to be received within the mounting recess 139 provided by the front door hinge bracket lower flange 136.

As shown in FIGS. 4-5 and discussed briefly hereinbefore, the pin portion 170 of the door checking device 118 includes three segments 170*a*, 170*b*, 170*c* and stepped surfaces 171, 173 between adjacent segments. This feature of the invention is more clearly illustrated in FIG. 12, wherein the pin portion 170 is shown installed within the front pillar hinge bracket 114 (i.e., between the upper and lower peripheral walls 160*a*, 160*b*).

More specifically, the relatively small-diameter first pin segment 170*a* extends into the upper mounting hole 157*a*, but during use preferably does not project above the upper peripheral wall 160*a* of the front pillar hinge bracket 114. Accordingly, the upper mounting hole 157*a* has a relatively small diameter, which is just slightly larger than the diameter of the first pin segment 170*a*, so as to closely receive the first pin segment 170*a*. Preferably, the distal end of the first pin segment 170*a* is slightly tapered, as illustrated, to facilitate insertion of the first pin segment 170*c* into the upper mounting hole 157*a*.

Providing a relatively small diameter first pin segment 170*a*, and a correspondingly small mounting hole 157*a*, permits the pin portion 170 to be rotatably received in the upper peripheral wall 160*a* of the front pillar hinge bracket 114 without significantly weakening the hinge bracket 114. Accordingly, minimizing the size of the first pin segment 170*a* and upper mounting hole 157*a* helps in maintaining the overall load-bearing capacity of the pillar hinge bracket 114.

The third pin segment 170*c* is inserted through the lower mounting hole 157*b* formed through the lower peripheral wall 160*b* of the front pillar hinge bracket 114. More specifically, the relatively large diameter third pin segment 170*c* extends above and below the lower peripheral wall 160*b*, as illustrated. The lower mounting hole 157*b* preferably has a diameter that is slightly larger than the third pin segment 170*c* so as to closely receive the third pin segment 170*c*. For reasons that will be clear from the following discussion, the amount the third pin segment 170*c* extends above the lower peripheral wall 160*b* is advantageously limited as much as possible.

Since the front checking device 118 serves as a spring to bias the front door 148 into one of two angular orientations, providing the third pin segment 170*c* as a relatively large diameter member is desirable to maintain the spring constant and, thus, the biasing force available from the front checking device 118. Naturally, the diameter of the active spring portion of the door checker (i.e., from the third pin segment 170*c* to the mounting projection 178) will be sized to provide the desired biasing force, and is dependent upon the intrinsic properties of the material from which the front checking device 118 is formed.

Finally, the relatively mid-sized second pin segment 170*b* is entirely disposed between the upper and lower peripheral walls 160*a*, 160*b*, as illustrated, and integrally extends between and interconnects the first and third pin segments 170*a*, 170*c*. The second pin segment 170*b* serves to define the first and second steps 171, 173 at the intersection with the first and third pin segments 170*a*, 170*c*, respectively. The steps 171, 173 are preferably sloping, as illustrated, by may also be planar, if desired. The slight sloping of the second step 173 assists in registration and insertion of the third pin segment 170*c* with or into the lower mounting hole 157*b* during assembly.

The intermediate-diameter second pin segment 170*b* provides a transition between the small diameter first pin segment 170*a*, which has reduced strength, and the larger diameter, enhanced strength third pin segment 170*c*. Accordingly, the second pin segment 170*b* helps to maintain the strength or resistance to deformation of the pin portion 170 between the upper and lower peripheral walls 160*a*, 160*b* of the hinge bracket 114. Further, the second pin segment 170*b* serves to minimize the pull-out force required to remove the front checking device 118 from the front pillar hinge 114.

More specifically, after use of the front checking device 118 in a painting operation, the entire front door hinge system 110, including the front checking device 118, will be coated with paint. Therefore, the outer diameter of the third pin segment 170*c* will increase by the thickness of the paint coating, and may be slightly larger than the diameter of the lower mounting hole 157*b*, thereby making removal of the front checking device 118 difficult. As will be clear to those skilled in the art, this difficulty in removing the front checking device 118 from the front pillar hinge bracket 114 is related to both the paint coating thickness and the amount or length of the third pin segment 170*c* extending above the lower peripheral bracket 160*b*.

However, by providing the relatively reduced diameter second pin segment 170*b* immediately above the third pin segment 170*c* and the lower peripheral wall 160*b*, the resistance to removal (i.e., pull-out force) created by the paint coating is minimized. It will be appreciated that this resistance to removal is further reduced by sizing the pin portion 170 such that amount the third pin segment 170*c* projects above the lower peripheral wall 160*b* is minimized and, preferably, such that the second pin segment is immediately vertically adjacent the lower peripheral wall (i.e., such that the second step 173 is co-planar with, or slightly above, the upper surface of the lower peripheral wall 160*b*).

Figure 13A:
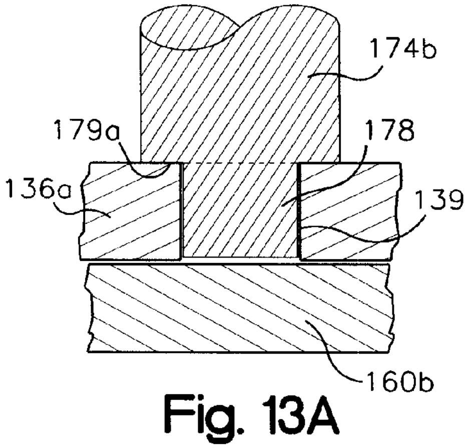
FIG. 13A schematically illustrates installation of a front checking device mounting projection relative to a front door hinge bracket and a front pillar hinge bracket.
Figure 13B:
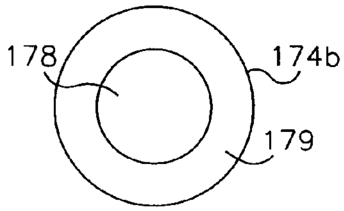
FIG. 13B is an end view of the front checking device mounting projection of FIG. 13A.

With reference to FIGS. 13A-13B, reception of the terminal mounting projection 178 projecting from the second end 174*b* of the second U-shaped portion 174 in the mounting recess 139 is illustrated. It is noted that the second end 174*b* defines an annular support surface 179 surrounding an upper end of the mounting projection 178, and that the door checker annular support surface 179 rests upon an upper face of the lower flange projecting portion 136*a* that partially surrounds the mounting recess 139.

Further, the mounting projection 178 preferably has a length that is substantially equal to the height of the lower flange projecting portion 136*a*. In this regard it is noted that the length of the mounting projection 178 may be less than, or even slightly greater than, the height of the projecting portion 136*a* so long as the mounting projection 178 does not engage the lower peripheral wall 160*b* of the pillar hinge bracket 114, which is disposed beneath the door hinge bracket projecting portion 136*a*, as illustrated. By moderating the length of the mounting projection 178 so as to prevent engagement between the mounting projection 178 and the lower peripheral wall 160*b*, interference between the mounting projection 178 and the pillar hinge bracket 114 during opening and closing movement of the door 148 is avoided. As will be clear from FIG. 13B, the mounting projection 178, annular support surface 179, and second end of the 174*b* of the second U-shaped portion 174 are generally coaxial to one another.

Figure 15A:
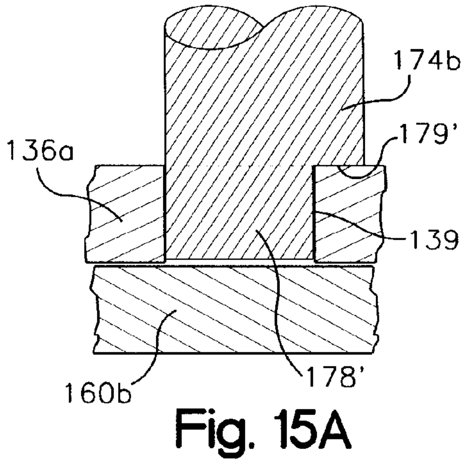
FIG. 15A schematically illustrates installation of an alternative front checking device mounting projection relative to the front door hinge bracket and front pillar bracket.
Figure 15B:
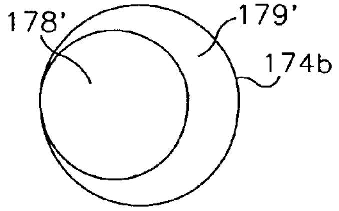
FIG. 15B is an end view of the alternative front checking device mounting projection illustrated in FIG. 15A.

FIGS. 15A and 15B illustrate an alternative construction of the mounting projection 178' at the second end 174*b* of the second U-shaped portion 174. In this alternative construction, the mounting projection 178' is laterally offset so as to not be axially aligned with the second end 174*b* of the second U-shaped portion 174. As such, a crescent shaped mounting surface 179' extends partially around the mounting projection 178'.

The crescent shaped mounting surface 179' engages the upper face of the lower flange projecting portion 136*a* and thereby supports the front checking device 118 and limits insertion of the mounting projection 178' relative to the mounting recess 139. Accordingly, operation of the alternative construction is essentially the same as that of the construction illustrated in FIGS. 13A-13B and described hereinbefore. By provision of the crescent shaped mounting surface 179' and properly sizing the length of the mounting projection 178' relative to the height of the projecting portion 136*a*, interference or contact between the mounting projection 178' and the subjacent pillar hinge bracket lower peripheral wall 160*b* during opening and closing of the door 148 can be avoided.

Figure 8:
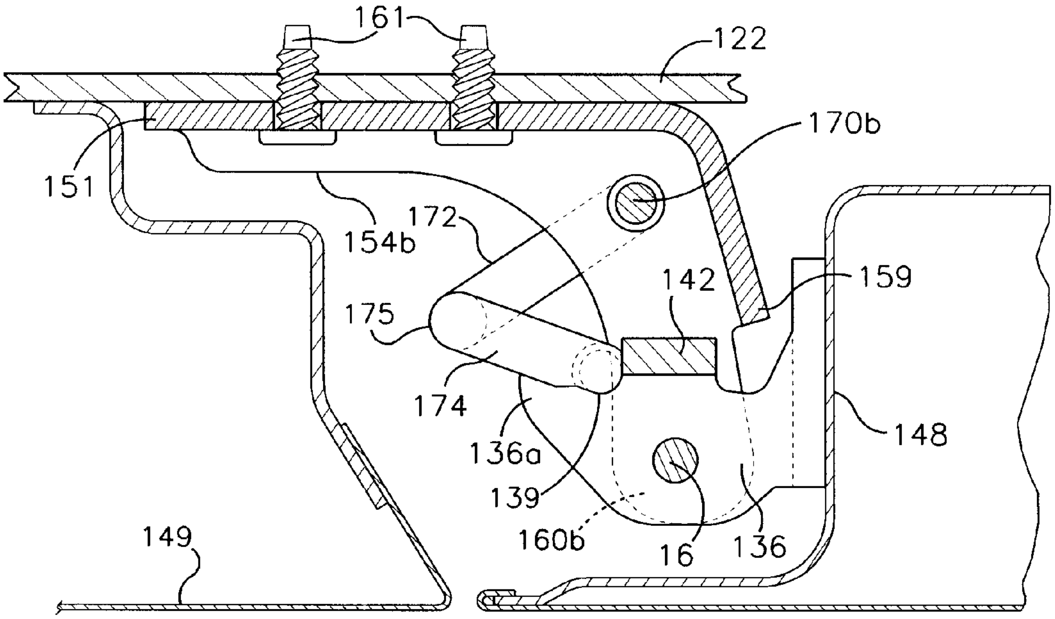
FIG. 8 is a top cross-sectional view of the front door hinge system of FIGS. 4-5 installed on a vehicle, with the front vehicle door in a closed position.
Figure 9:
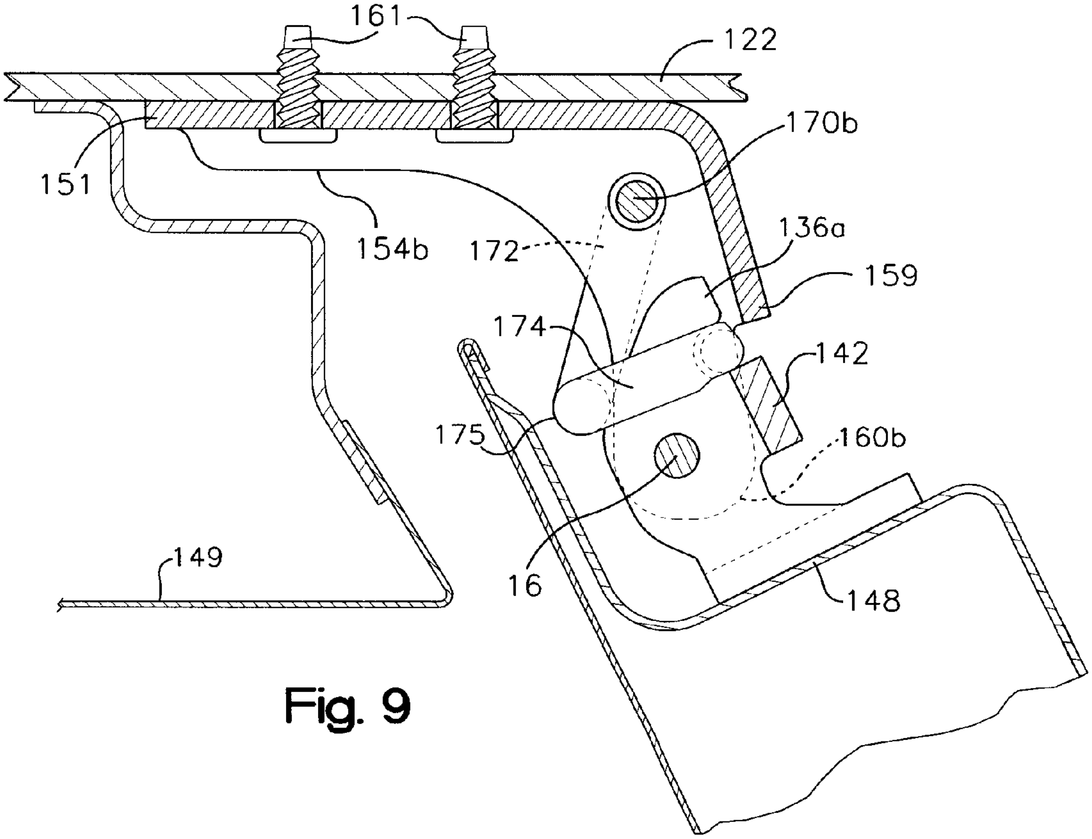
FIG. 9 is a top cross-sectional view of the front door hinge system of FIGS. 4-5 installed on a vehicle, with the front vehicle door in an open position.

With reference to FIGS. 8 and 9, operation of the front checking device 118 to maintain the associated vehicle front door 148 in either of a first angular orientation (closed position; FIG. 8) or a second angular orientation (open position; FIG. 9) will be explained. For reasons that will be apparent from the following discussion, the first angular orientation is a full closed position whereas the second angular orientation is a partially open position. The second angular orientation in the illustrated embodiment is about 65°, although it is recognized that other orientations, such as between about 55 to 80° may also be selected with equal functionality. Moreover, it is noted that the spring portion of the front checking device 118 is preferably unstressed in each of the first and second angular orientations.

In FIGS. 8 and 9, the front hinge pillar bracket 114 is affixed to the vehicle front pillar 122 (i.e., A-pillar) and the front door bracket is affixed to the vehicle door 148. Further, the position of the front fender 149 relative to the front door 148 is illustrated.

As the front door 148 moves from the first angular orientation to the second angular orientation (FIG. 9), the pin portion 170 of the front checking device 118 rotates in the mounting holes 157*a*, 157*b*, and the mounting projection 178 rotates in the mounting recess 139. Further, the mounting projection 178 is brought toward the pin portion 170, stressing the first and second U-shaped portions 172, 174, which applies a biasing force on the front door 148.

As will be apparent to those skilled in the art, the position of maximum spring bias is preferably at an angular orientation between the first and second angular orientations, and the direction in which the door 148 will be urged or biased will be dependent upon which side of the position of maximum spring bias the front door is positioned. If the front door 148 is between the first angular orientation and the angular orientation corresponding to the position of maximum spring bias when released, the front door 148 will be urged to the first angular orientation. On the other hand, if the front door 148 is between the second angular orientation and the angular orientation corresponding to the position of maximum spring bias when released, the front door 148 will be urged to the second first angular orientation. Accordingly, at any position during movement between the first angular orientation (FIG. 8) and the second angular orientation (FIG. 9), release of the door 148 will permit the checking device 118 to rotate the door 148 into one of the first and second angular orientations.

At the second angular orientation illustrated in FIG. 9, the linear segment 175 of the door checking device 118 abuts or engages the lateral surface of the lower peripheral wall 160*b* of the pillar hinge bracket 114, which serves as a positive stop to further opening movement of the door 148. Accordingly, due to the provision of this positive stop, there is no oscillation of the door about the second angular orientation. Rather, the door 148 is securely held in the open position.

Provision of the flattened or planar surface 180 at the second end 174*b* of the second U-shaped portion 174 permits the front checking device 118 to freely rotate past the bridge member 142 as the door 148 is moved from the first angular orientation into the second angular orientation. While the planar surface 180 is desirable for this purpose, it is believed apparent that the planar surface 180 may not be necessary in similar installations wherein further spacing between the second end 174*b* and the bridge member 142 is provided and, therefore, may be considered optional.

The rear door hinge system 210 according to the second embodiment of the present invention is illustrated in FIGS. 6, 7, 10, 11, 14A, 14B, 16A and 16B. It will be appreciated that the rear door hinge system 210 is structurally similar to the previously described front door hinge system 110 in many respects. However, due to the different mounting and loading considerations, several structural differences between the hinge systems 110, 210 exist, as will be apparent to those skilled in the art.

Figure 6:
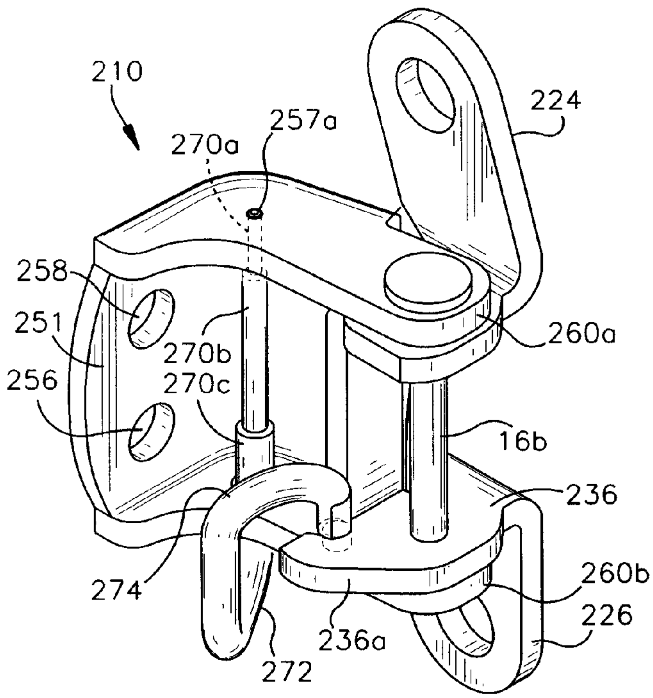
FIG. 6 is a perspective view of a rear door hinge system according to the second embodiment of the present invention.
Figure 7:
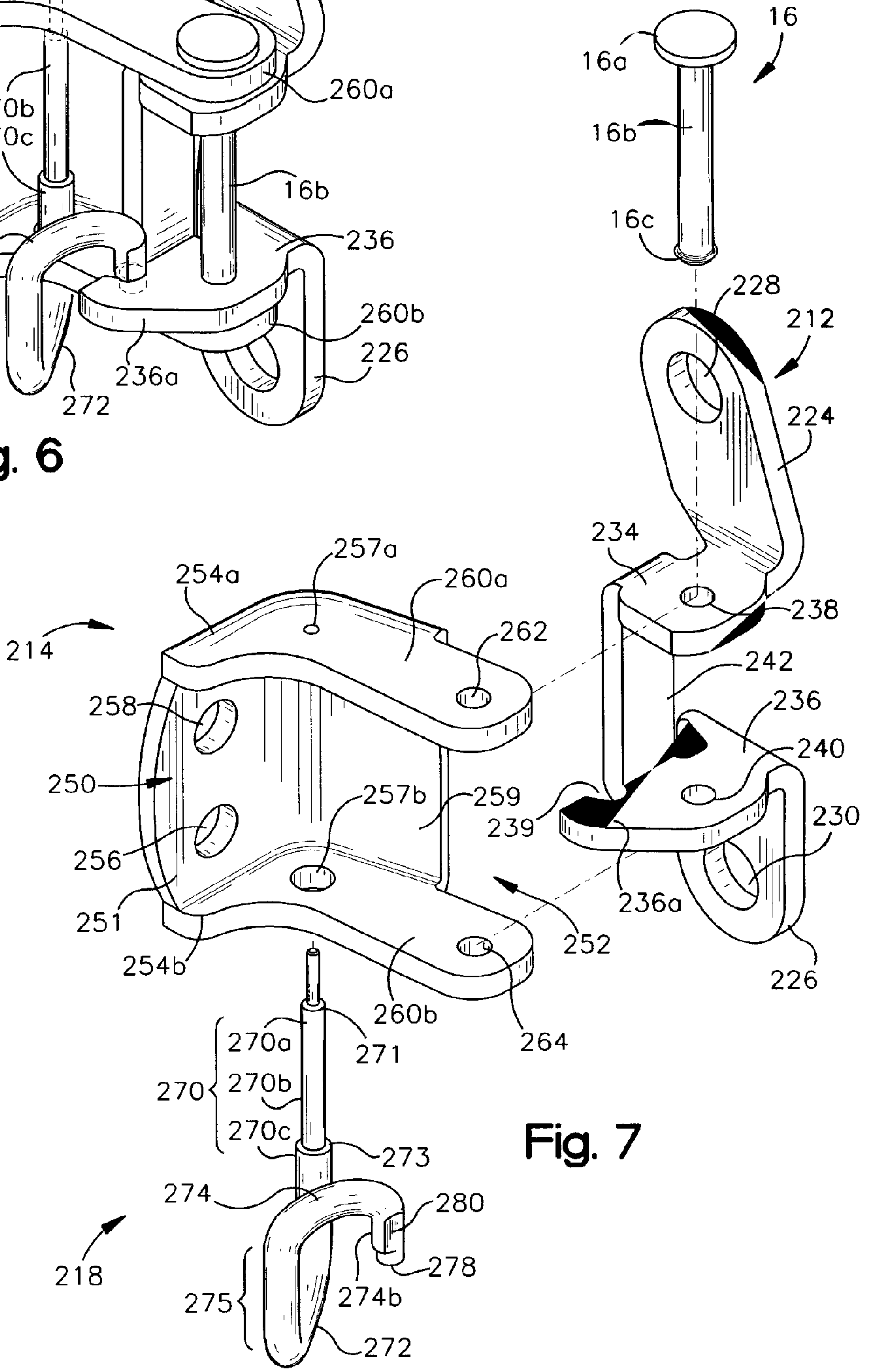
FIG. 7 is an exploded view of the rear door hinge system of FIG. 6.

FIG. 6 shows the rear door hinge system 210 in an assembled condition wherein a rear door hinge bracket 212 is pivotally secured to a rear pillar hinge bracket 214 via the hinge pin 16, and wherein the rear checking device 218, described hereinafter, is inserted into the rear hinge brackets 212, 214. FIG. 7 shows the rear hinge system 210 in an exploded condition.

With reference to FIGS. 6, 7, 10, and 11, the rear door hinge bracket 212 is affixable to a vehicle rear door 248 and includes a first or upper ear 224 extending vertically upward and a second or lower ear 226 extending vertically downward. Each ear 224, 226 defines a hole 228, 230 for the passage of a fastener to affix the rear door hinge bracket 212 to the vehicle rear door 248.

A first or upper planar flange 234 is integrally formed with the first ear 224 and extends generally perpendicular thereto and away from the vehicle rear door 248. A second or lower planar flange 236 is integrally formed with the second ear 226 and extends generally perpendicular thereto and away from the vehicle rear door 248. Each flange 234, 236 defines a hole 238, 240 through which the hinge pin 16 extends.

The lower flange 236 of the door hinge bracket 212 includes an extending portion 236*a* that extends outwardly opposite the second ear 226. A mounting recess 239 is formed in a lateral surface of the extending portion 236*a* of the lower flange 236 at a position outwardly spaced from the vehicle door 48. As will be appreciated, the mounting recess 239 is formed in a surface of the extending portion 236*a* that faces toward the vehicle rear pillar 222 (i.e., B-pillar), described hereinafter. Preferably, the mounting recess 239 is semi-circular or arcuate in shape, and is sized to positively receive a lower portion (referred to hereinafter as the mounting projection 278) of the door checker 218, described hereinafter. Naturally, the mounting recess 239 may, instead of curved or arcuate, have any other peripheral shape that is desired.

A bridge member 242 extends between the upper and lower flanges 234, 236, and thus, serves as a structural support. The bridge member 242 protrudes from the upper planar flange 234 at a position adjacent the upper ear 224 and between a rear side of the rear pillar hinge bracket 214 and vehicle rear door 248 when the system 210 is assembled. It is noted that the bridge member 242 is spaced slightly rearwardly (i.e., toward the rear door 248) from the mounting recess 239.

The rear pillar hinge bracket 214 of the hinge system 210 is affixable to a vehicle rear pillar 222. The rear pillar hinge bracket 214 is generally L-shaped and includes a pillar flange 250 and a pin bracket 252. The pillar flange 250 has a generally planar base wall 251 from which upper and lower raised peripheral walls 254*a*, 254*b* extend. The pillar flange 250 defines two holes 256, 258 that receive fasteners 261 to affix the rear pillar hinge bracket 214 to the vehicle rear pillar 222.

The pin bracket 252 is oriented generally perpendicular to the pillar flange 250 and includes a base wall 259 and upper and lower raised peripheral walls 260*a*, 260*b*. The base wall 259 of the pin bracket 252 integrally extends from the base wall 251 of the pillar flange 250. The upper and lower raised peripheral walls 260*a*, 260*b* of the pin bracket 252 integrally merge with the upper and lower raised peripheral walls 254*a*, 254*b*, respectively, of the pillar flange 250, as illustrated, so as to define upper and lower L-shaped walls.

Preferably, the pin bracket base wall 259 is shorter in length than the pin bracket peripheral walls 260*a*, 260*b* such that the pin bracket peripheral walls 260*a*, 260*b* extend past the end of the pin bracket base wall 259, as illustrated.

Each of the upper and lower pin bracket peripheral walls 260*a*, 260*b* define a hole 262, 264 near their distal ends, as illustrated. When the hinge system 210 is assembled, the holes 262, 264 defined by the pin bracket peripheral walls 260*a*, 260*b* align and cooperate with the holes 238, 240 formed in the upper and lower flanges 234, 236 of the rear door hinge bracket 212 to receive the hinge pin 16.

An upper mounting hole 257*a* is formed in the upper pin bracket peripheral wall 260*a* and a lower mounting hole 257*b* is formed in the lower pin bracket peripheral wall 260*b*. The upper and lower mounting holes 257*a*, 257*b* are vertically aligned with each other. The upper mounting hole 257*a* is generally disposed at a junction of the upper pin bracket peripheral wall 260*a* and the upper peripheral wall 254*a*. The lower mounting hole 257*b* is generally disposed at a junction of the lower pin bracket peripheral wall 260*b* and the lower peripheral wall 254*b*, as illustrated. It will be appreciated that, while the upper and lower mounting holes 257*a*, 257*b* are preferably coaxial, a diameter of the upper mounting hole 257*a* is substantially smaller than a diameter of the lower mounting hole 257*b*, for purposes that will be apparent from the following description.

The mounting recess 239 and the mounting holes 257*a*, 257*b* of the hinge brackets 212, 214 cooperate to receive the checking device 218, as described hereinafter. The exact position of the mounting recess 239 and mounting holes 257*a*, 257*b* may be modified from that disclosed herein so as to provide the desired operating characteristics of the device. Moreover, the size and shape of the mounting recess 239 and mounting holes 257*a*, 257*b* are adapted to the particular checking device being used and, therefore, are not limited to those specifically described and illustrated herein. It is preferred, though not required, that mounting recess 239 and the mounting hole 257*b* are spatially positioned such that the distance therebetween is equal at two distinct rotary positions (e.g. first and second rear door angular orientations shown in FIGS. 10 and 11) such that the position of greatest checking device spring compression is midway between the two distinct rotary positions (i.e., midway between the first angular orientation of FIG. 10 and the second angular orientation of FIG. 11).

In FIG. 7, the hinge system 210 is shown in an exploded form, including the temporary checking device 218. The checking device 218 includes a pin portion 170 and first and second U-shaped portions 272, 274.

The pin portion 270 includes first, second, and third coaxial segments 270*a*, 270*b*, 270*c* having first, second and third diameters, respectively, so as to define a first transition or step 271 between the first and second segments 270*a*, 270*b* and a second transition or step 273 between the second and third segments 270*b*, 270*c*.

It will be appreciated that the rear door checker pin portion 270, although longer than the pin portion 170 described hereinbefore, is substantially identical thereto in practice and use. Therefore, the description provided hereinbefore with regard to the front door checker pin portion 170 is equally applicable to the rear door checker pin portion 270 and, accordingly, will not be repeated hereinafter for purposes of brevity. Further, the rear door checker first and second U-shaped portions 272, 274 are substantially identical in shape and configuration to the previously described front door checker first and second U-shaped portions 172, 174, with the only differences being variations in length or angular orientation to accommodate the dimensional differences of the rear door hinges 212, 214 as compared to the front door hinges 112, 114. Accordingly, the rear door checker first and second U-shaped portions 212, 214 will not be discussed at length hereinafter. It is noted, however, that the mounting projection 278 projecting from the second end 274*b* of the rear checking device second U-shaped section is preferably different than the corresponding mounting projection 178 of the front checking device second U-shaped portion 214 and, accordingly, this aspect of the rear checking device 218 will be discussed briefly hereinafter.

Figure 14A:
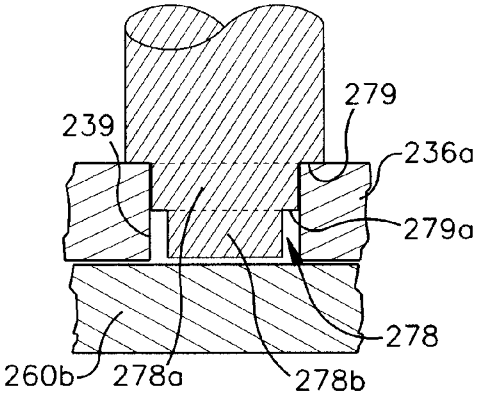
FIG. 14A schematically illustrates installation of a rear checking device mounting projection relative to a rear door hinge bracket and a rear pillar hinge bracket.
Figure 14B:
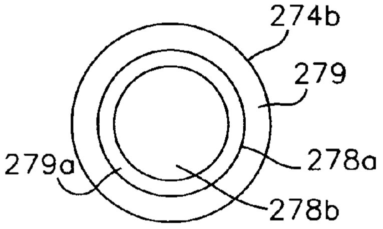
FIG. 14B is an end view of the rear checking device mounting projection of FIG. 14A.

With reference to FIGS. 14A-14B, reception of the mounting projection 278 extending from the second end 274*b* of the second U-shaped portion 274 of the rear checking device 218 in the mounting recess 239 is illustrated. It will be appreciated from the following discussion that the rear door checker mounting projection 278 is the counterpart to the front door checker mounting projection 178 illustrated in FIGS. 13A-13B and discussed hereinbefore.

It is noted that the second end 274*b* defines an annular support surface 279 surrounding an upper end of the mounting portion 278, and that the door checker annular support surface 279 rests upon an upper face of the lower flange projecting portion 236*a* that partially surrounds the mounting recess 239.

Further, the mounting projection 278 includes an upper portion 278*a* extending from the annular support surface 279 and a lower portion 278*b* extending from the upper portion 278*a*. The upper portion 278*a* has a reduced diameter as compared to the second end 274*b* of the second U-shaped portion 274, while the lower portion 278*b* has a reduced diameter as compared to the upper portion 278*a*. The upper portion 278*a* defines an annular surface 279*a* surrounding the lower portion 278*b*, as illustrated.

As will be appreciated by those skilled in the art, and by comparing the corresponding structure shown in FIGS. 13A-13B to that of FIGS. 14A-14B (i.e., the projecting projection 178 to the projecting portion 278), the front checking device 118 and rear door checker 218 may be readily tactilely or visually distinguished from one another by the assembler. Accordingly, the different circumferential profiles at the ends of the front and rear door checkers 118, 218 help to prevent improper installation (i.e., installing the front checking device 118 in the rear door hinges 212, 214, etc.).

As in the case of the front checking device 118, the mounting projection 278 preferably has a length that is substantially equal to the height of the lower flange projecting portion 236*a*. In this regard it is noted that the length of the mounting projection 278 may be less than, or even slightly greater than, the height of the projecting portion 236*a* so long as the mounting projection 278 does not engage the lower peripheral wall 260*b* of the pillar hinge bracket 214, which is disposed beneath the door hinge bracket projecting portion 236*a*, as illustrated. By moderating the length of the mounting projection 278 so as to prevent engagement between the mounting projection 278 and the lower peripheral wall 260*b*, interference between the mounting projection 278 and the pillar hinge bracket 214 during opening and closing movement of the door 248 is avoided. As will be clear from FIG. 14B, the upper and lower portions 278*a*, 278*b* of the mounting projection 278, annular support surface 279, and second end of the 274*b* of the second U-shaped section 274 are generally coaxial to one another.

Further, it may be desirable to initially rest the annular surface 279*a* on the upper surface of the projecting portion 236*a* such that only the lower portion 278*b* extends into the mounting recess 239. Such initial positioning may be easier for the assembler, and the rear door checker 218 will drop into the final position illustrated in FIG. 14A upon movement of the door 248.

Figure 16A:
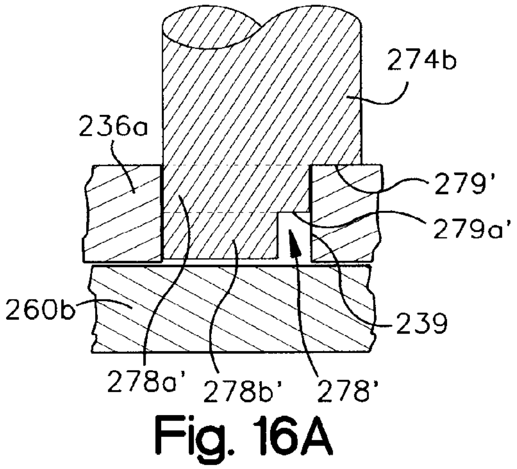
FIG. 16A schematically illustrates installation of an alternative rear checking device mounting projection relative to the rear door hinge bracket and rear pillar bracket.
Figure 16B:
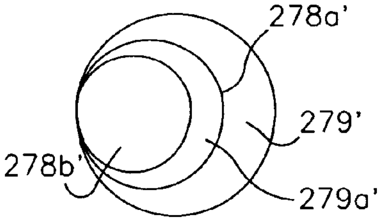
FIG. 16B is an end view of the alternative rear checking device mounting projection illustrated in FIG. 16A.

FIGS. 16A and 16B illustrate an alternative construction of the mounting projection 278' at the second end 274*b* of the second U-shaped section 274, and are the rear door checker counterpart to the front door checker mounting projection 178' illustrated in FIGS. 15A, 15B and discussed hereinbefore. In this alternative construction, the mounting projection 278' is laterally offset so as to not be axially aligned with the second end 274*b* of the second U-shaped section 274.

The mounting projection 278' includes an upper portion 278*a'* and a lower portion 278*b'*. The upper portion 278*a'* extends from the crescent shaped support surface 279' and the lower portion 278*b* extends axially from the upper portion 278*a'*. The upper portion 278*a'* has a reduced diameter as compared to the second end 274*b* of the second U-shaped portion 274, while the lower portion 278*b'* has a reduced diameter as compared to the upper portion 278*a'*. As such, a crescent shaped mounting surface 279' extends partially around the mounting projection upper portion 278*a'* and a crescent shaped surface 279*a'* extends partially around the mounting projection lower portion 278*b'*.

The crescent shaped mounting surface 279' engages the upper face of the lower flange projecting portion 236*a* and thereby supports the door checker 218 and limits insertion of the mounting projection 278' relative to the mounting recess 239. Accordingly, operation of the alternative construction is essentially the same as that of the construction illustrated in FIGS. 14A-14B and described hereinbefore. By provision of the crescent shaped mounting surface 279' and properly sizing the length of the mounting projection 278' relative to the height of the projecting portion 236*a*, interference or contact between the mounting projection 278' and the subjacent pillar hinge bracket lower peripheral wall 260*b* during opening and closing of the door 248 can be avoided.

Further, as in the embodiment of FIGS. 14A-14B discussed hereinbefore, it may be desirable to initially rest the annular surface 279*a'* on the upper surface of the projecting portion 236*a* such that only the lower portion 278*b'* extends into the mounting recess 239. Such initial positioning may be easier for the assembler, and the rear door checker 218 will drop into the final position illustrated in FIG. 14A upon movement of the door 248.

As will be appreciated by those skilled in the art, and by comparing the corresponding structure shown in FIGS. 15A-15B to that of FIGS. 16A-16B ((i.e., the projecting projection 178' to the projecting portion 278'), the alternative construction of the front door checker mounting projection 178' may be readily distinguished, both tactilely and visually, from the alternative construction of the rear door checker mounting projection 278'. Accordingly, the different circumferential profiles at the ends of the front and rear door checkers 118, 218 help to prevent improper installation (i.e., installing the front checking device 118 in the rear door hinges 212, 214, etc.).

Moreover, it is noted that the mounting projection 178, 178' of the front door checkers consistently have a constant diameter whereas the mounting projection 278, 278' of the rear door checker consistently have a varying diameter or step-like shape. Accordingly, this consistent difference will permit the assembler to readily distinguish, both tactilely and visually, the front door checkers from the rear door checkers during the assembly process, described hereinafter.

Figure 10:
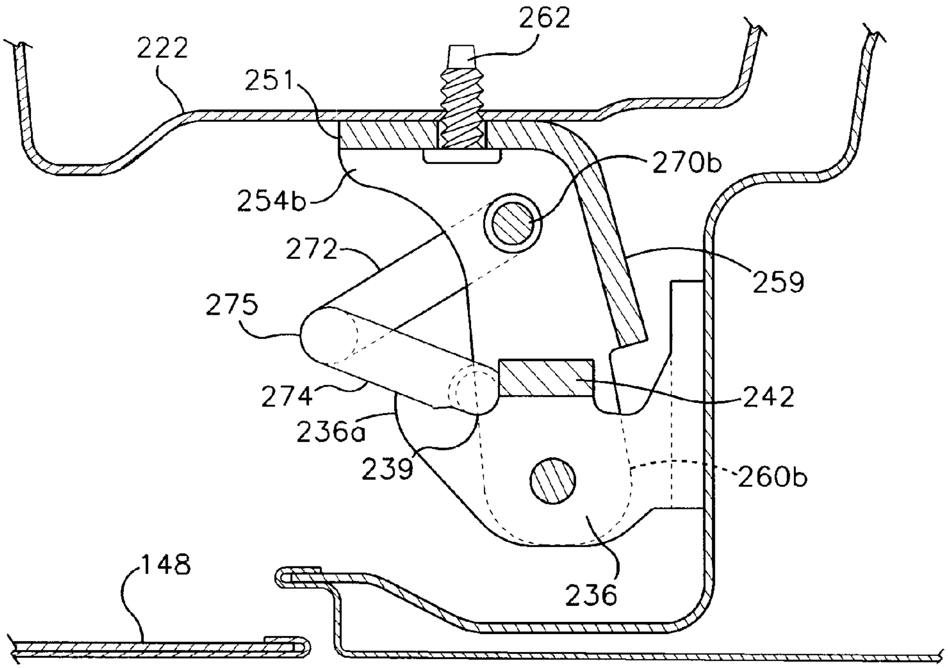
FIG. 10 is a top cross-sectional view of the rear door hinge system of FIGS. 6-7 installed on a vehicle, with the rear vehicle door in a closed position.
Figure 11:
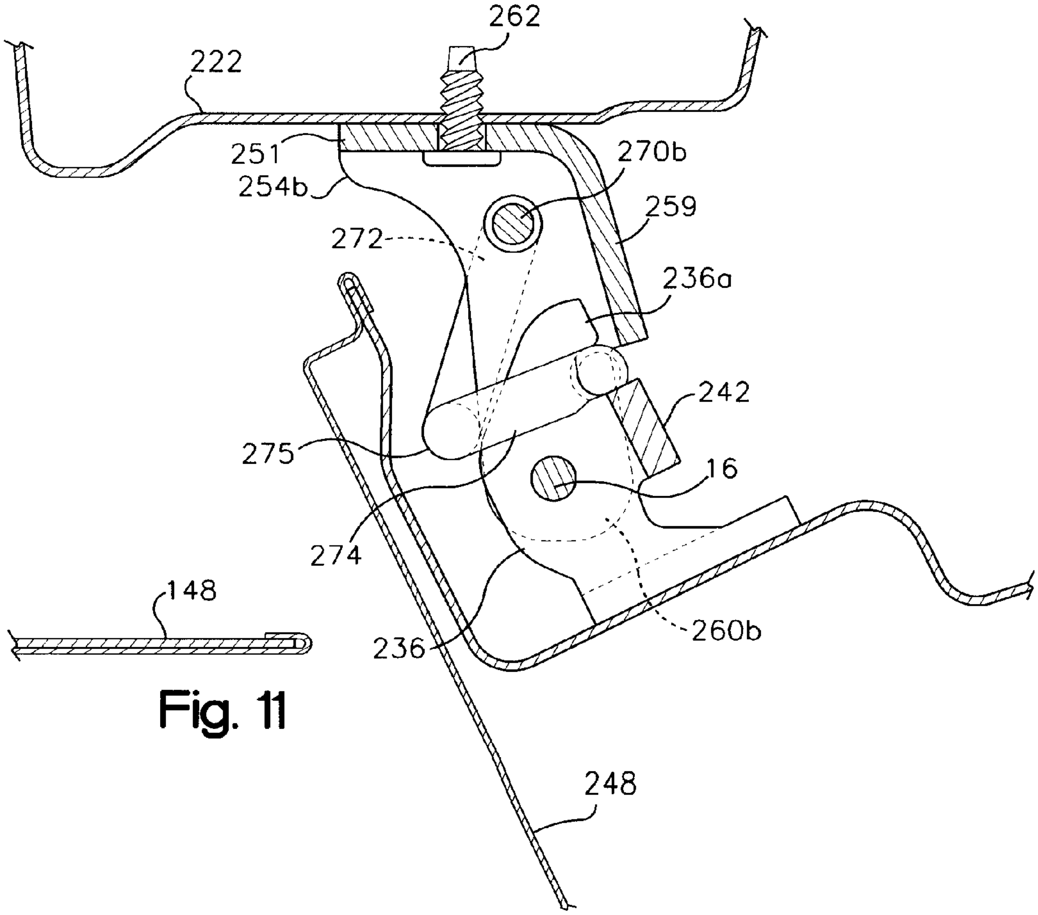
FIG. 11 is a top cross-sectional view of the rear door hinge system of FIGS. 6-7 installed on a vehicle, with the rear vehicle door in the open position.

With reference to FIGS. 10 and 11, operation of the rear checking device 218 to maintain the associate vehicle rear door 248 in either of a first angular orientation (closed position; FIG. 10) or a second angular orientation (open position; FIG. 11) will be explained. For reasons that will be apparent, the first angular orientation is a full closed position whereas the second angular orientation is a partially open position. The second angular orientation in the illustrated embodiment is about 65°, although it is recognized that other orientations, such as between about 55 to 80° may also be selected with equal functionality. Moreover, it is noted that the spring portion of the rear checking device 218 is preferably unstressed in each of the first and second angular orientations.

In FIGS. 10 and 11, the rear hinge pillar bracket 214 is affixed to the vehicle B-pillar 222 and the rear door hinge bracket 212 is affixed to the vehicle rear door 248. Further, the position of the trailing edge of the front door 148 relative to the rear door 248 is illustrated. It will be appreciated from FIG. 10, and should be kept in mind for later, that the rear door hinge system 210 is accessible when the front door 148 is open (i.e., see FIGS. 17A and 17C).

As the rear door 248 moves from the first angular orientation to the second orientation (FIG. 11), the pin portion 270 of the rear checking device 218 rotates in the mounting holes 257*a*, 257*b*, and the mounting projection 278, 278' rotates in the mounting recess 239. Further, the mounting projection 278, 278' is brought toward the pin portion 270, stressing the first and second U-shaped portions 272, 274, and applying a biasing \force to the rear door 248.

As will be apparent to those skilled in the art, the position of maximum spring bias is preferably at an angular orientation between the first and second angular orientations, and the direction in which the rear door 248 will be urged or biased will be dependent upon which side of the position of maximum spring bias the rear door 248 is positioned. If the rear door 248 is between the first angular orientation and the angular orientation corresponding to the position of maximum spring bias when released, the rear door 248 will be urged to the first angular orientation. On the other hand, if the rear door 248 is between the second angular orientation and the angular orientation corresponding to the position of maximum spring bias when released, the rear door 248 will be urged to the second first angular orientation. Accordingly, at any position during movement between the first angular orientation (FIG. 10) and the second angular orientation (FIG. 11), release of the door 248 will permit the checking device 218 to rotate the door 248 into one of the first and second angular orientations.

At the second angular orientation illustrated in FIG. 11, the linear segment 275 of the door checking device 218 abuts or engages the lateral surface of the lower peripheral wall 260*b* of the pillar hinge bracket 214, which serves as a positive stop to further opening movement of the rear door 248. Accordingly, due to the provision of this positive stop, there is no oscillation of the rear door 248 about the second angular orientation. Rather, the rear door 248 is securely held in the open position.

Provision of the flattened or planar surface 280 at the second end 274*b* of the second U-shaped portion 274 permits the front checking device 218 to freely rotate past the bridge member 242 as the door 248 is moved from the first angular orientation into the second angular orientation. While the planar surface 280 is desirable for this purpose, it is believed apparent that the planar surface 280 may not be necessary in similar installations wherein further spacing between the second end 274*b* and the bridge member 242 is provided and, therefore, may be considered optional.

Figure 17C:
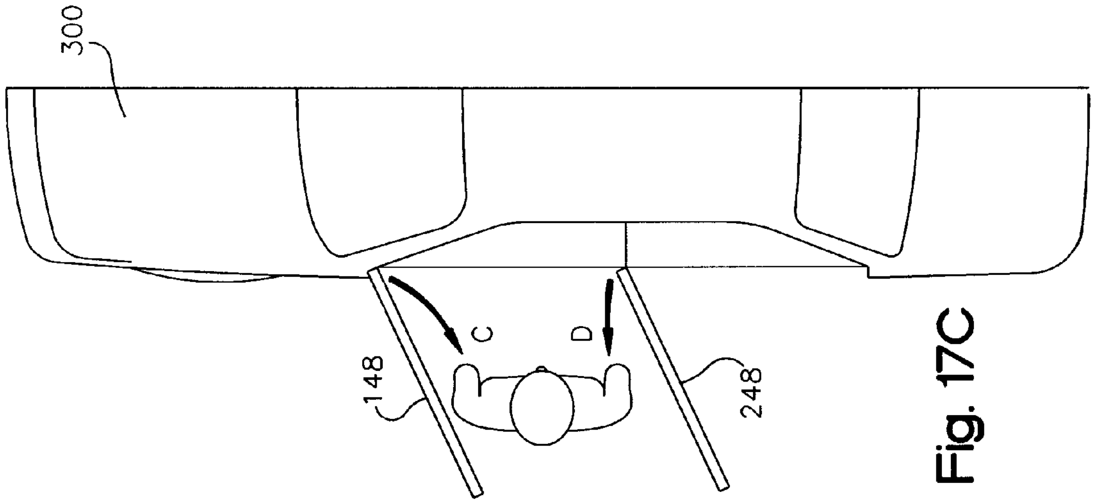
FIG. 17A schematically illustrates a procedure for installation of the front and rear checking devices.
FIG. 17B schematically illustrates movement of the front and rear doors following installation of the front and rear checking devices; and, FIG. 17C schematically illustrates a procedure for removal of the front and rear checking devices.
Figure 17B:
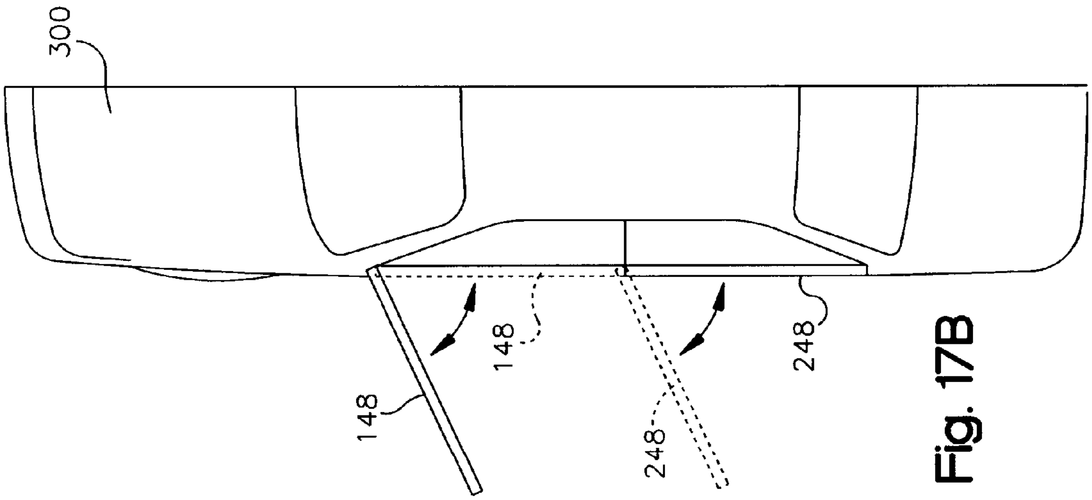
Figure 17A:
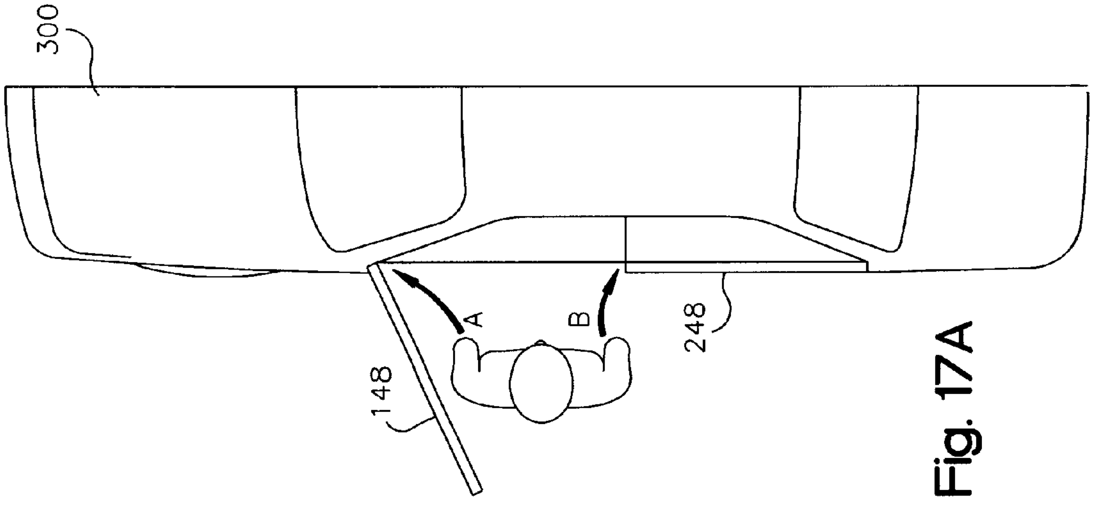

With reference to FIGS. 17A-17C, installation, use, and removal of the door checking devices 118, 218 on a vehicle 300 will hereinafter be described. Although FIGS. 17A-17C illustrate only one side of the vehicle 300, it is considered apparent that the door checking devices 118, 218 are also installed, used, and removed from the opposite side of the vehicle 300. Further, it is noted that upper and lower hinges are provided for the front and rear doors 148, 248, respectively, preferably only one hinge system 110, 210 (i.e., only one checking device 118, 218) is provided for each door 148, 248. Naturally, two such hinge systems 110, 210 may be provided for each door, if desired.

FIG. 17A illustrates a condition in which the front and rear vehicle doors 148, 248 are prepared for receipt of the front and rear checking devices 118, 218, respectively. More specifically, the front door 148 is in the second angular orientation or open position, while the rear door 248 is in the first angular orientation or closed position. As noted previously, opening the front door 148 gives access to the rear hinge brackets 212, 214. The front checking device 118 is installed in the direction of arrow "A" while the rear checking device 218 is installed in the direction of arrow "B" in FIG. 17A.

Referring back to FIGS. 4 and 5, with the mounting projection 178 rotated out of engagement with the hinge brackets 112, 114, the pin portion 170 of the front checking device 118 is inserted vertically upwardly, first through the lower mounting hole 157*b* and then through the upper mounting hole 157*a* such that the first segment 170*a* projects through the upper mounting hole 157*a* and above the surface of the upper peripheral wall 160*a*. At this point the third segment 170*c* extends through the lower mounting hole 157*b*.

Figure 12:
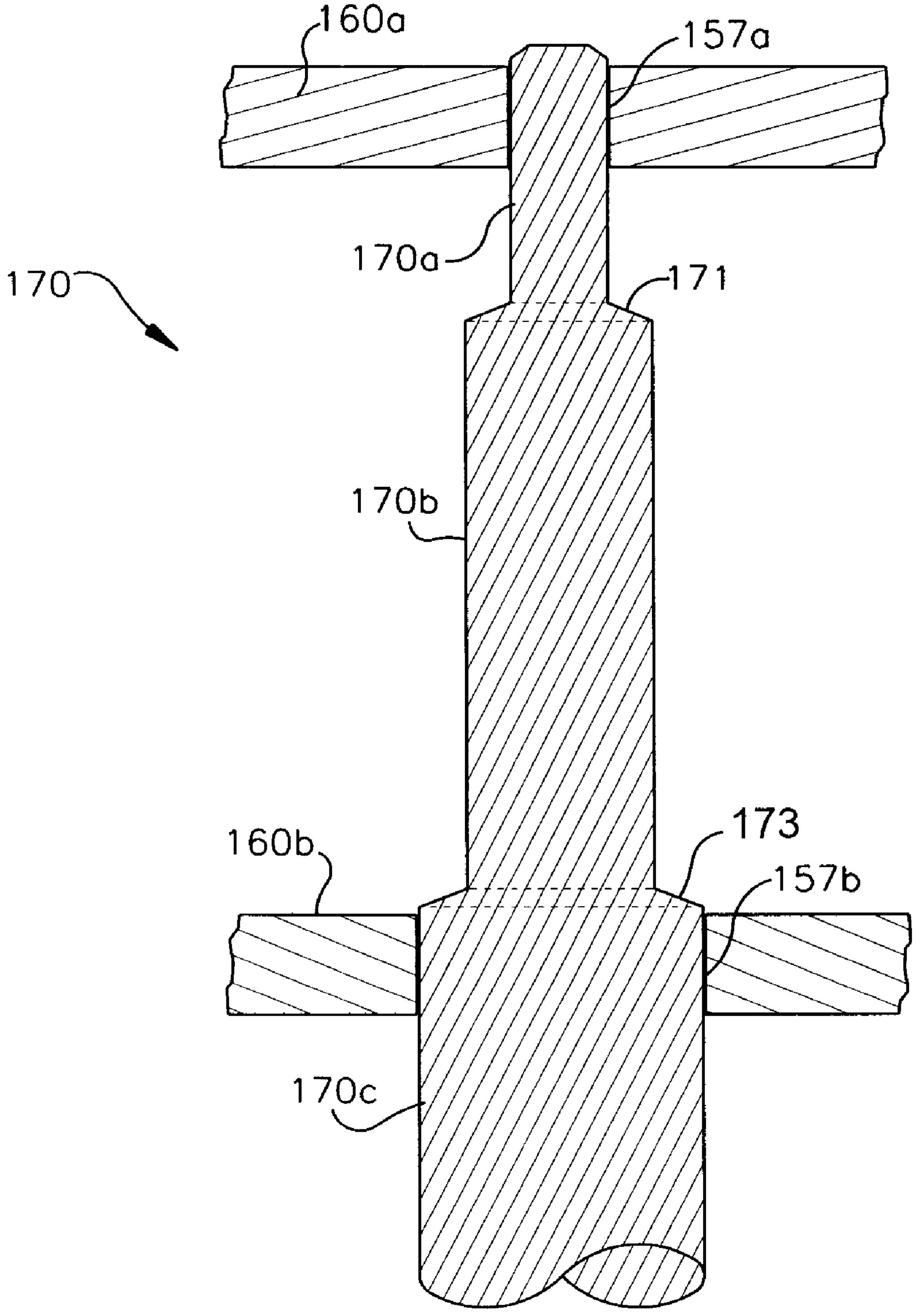
FIG. 12 is cross-sectional view of a pin portion of the front checking device of FIGS. 4-5 installed in a pillar hinge bracket.

With the first segment 170*a* projecting above the upper peripheral wall 160*a*, the mounting projection 178 is vertically spaced above the upper surface of the lower flange 136. Therefore, the front checking device 118 is simply rotated to move the mounting projection 178 over the lower flange 136 of the door hinge bracket 112 and into alignment with the mounting recess 139. Thereafter, the front door checker 118 is lowered into the condition illustrated in FIG. 4 such that the mounting projection 178 is received by the mounting recess 139, and such that the first pin segment 170*a* is returned to a flush or recessed condition within the upper mounting hole 157*a* (FIG. 12).

The rear door checking device 218 is installed in the rear door hinge brackets 212, 214 in substantially the same fashion, but with the rear door 248 retained in the first angular orientation (closed position) as shown by arrow "B" in FIG. 17A. In this regard it is noted that the relatively different configurations of the mounting projections 178, 178', 278, 278', which were described hereinbefore with reference to FIGS. 13A-16B, permits the associate to readily distinguish the front door checker 118 from the rear door checker 218.

Thereafter, the vehicle is moved along the assembly line and processed (i.e., sealing and painting operations), with the doors 148, 248 being moved between the first and second angular orientations, as desired (FIG. 17B). It will be appreciated that, due to the biasing forces applied by the spring checkers 118, 218, the doors 148, 248 are reliably and consistently placed in only the first and second angular orientations, preferably by operation of mechanical or robotic actuators (not shown), which are well known in the art. It will be further appreciated that, when moved to the second angular orientation, engagement between the linear segment 175, 275 and the hinge bracket 114, 214 prevents undesirable oscillation or vibration of the door 148, 248.

With reference to FIG. 17C, when the processing operations are completed such that the checking devices 118, 218 are no longer required, the checking devices are removed. Removal of the checking devices 118, 218 is accomplished by reversing the installation process. More specifically, the front door 148 is opened to gain access to the front checking device 118 (arrow "C") and the rear checking device 248 (arrow "D").

With reference to the front door hinge system 110 illustrated in FIGS. 4 and 5, the checking device 118 is first pushed upwardly to withdraw the mounting projection 178 from the mounting recess 139 and such that the first pin segment 170*a* projects above the upper peripheral wall 160*a*. Thereafter, the checking device 118 is rotated to move the mounting projection 178 out of vertical alignment with the hinge brackets 112, 114, and then the checking device is pulled out of the hinge brackets so as to remove the pin portion 170 from the upper and lower mounting holes 157*a*, 157*b*. It will be appreciated that removal of the rear checking device 218 is substantially identical, albeit with the rear door 248 in the first orientation (closed position).

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method for biasing a vehicle door to any one of first and second angular orientations and for releasably holding the door in any one of the first and second angular orientations, comprising the steps of:

providing a hinge system comprising a door hinge bracket, a pillar hinge bracket, and a hinge pin rotatably connecting the brackets to one another;

affixing the door hinge bracket to the vehicle door;

affixing the pillar hinge bracket to a vehicle pillar;

connecting a checking device between the door hinge bracket and the pillar hinge bracket, said checking device including a spring portion that is compressed by movement of the door from one of the first and second angular orientations toward the other of the first and second angular orientations;

wherein said checking device is operable to return the door to either of said first and second angular orientations.

2. The method of claim 1, wherein the pillar hinge bracket defines two mounting holes and the connecting step includes inserting a first pin portion of the checking device into the mounting holes.

3. The method of claim 2, wherein the checking device is connected by upward movement of the first pin portion while slightly compressing the spring portion of the checking device.

4. The method of claim 1, wherein the vehicle includes a front door and a rear door and the front door is opened to provide access to both the front door hinge bracket and pillar hinge bracket before connecting the checking device.

5. The method of claim 1, wherein the spring portion comprises two U-shaped portions inverted with respect to one another and sharing a common leg, wherein the three legs of each U-shaped portion define a plane and wherein the plane defined by the first U-shaped portion is rotated approximately 45 degrees, around the shared leg, out of alignment from the plane defined by the second U-shaped portion.

6. The method of claim 3, wherein removal of the checking device is done by downward movement of the first pin portion while slightly compressing the spring portion of the checking device.

7. The method of claim 2, wherein the door hinge bracket defines an additional mounting recess and the checking device includes a spring portion having two U-shaped portions inverted with respect to one another and sharing a common leg and wherein a non-shared leg of the second U-shaped portion includes a planar surface adjacent to which a cylindrical mounting portion extends, the mounting portion fitting into said mounting recess.

8. The method of claim 7, wherein a non-shared leg of the first U-shaped portion includes first, second, and third coaxial segments having first, second, and third different diameters respectively, and wherein the first coaxial segment fits into the first of the two mounting holes, said first hole being within an upper wall of the pillar hinge bracket and the third coaxial segment fits into the second of the two mounting holes, said second hole being within a lower wall of the pillar hinge bracket.

9. The method of claim 2, wherein the door hinge bracket defines an additional mounting recess and the checking device includes a spring portion having two U-shaped portions inverted with respect to one another and sharing a common leg and wherein a non-shared leg of the second U-shaped portion includes an end having two cylindrical eccentric sections, one section fitting into said mounting recess.

* * * * *

UNITED STATES PATENT AND TRADEMARK OFFICE

CERTIFICATE OF CORRECTION

PATENT NO. : 7,585,013 B2 
APPLICATION NO. : 12/234092
DATED : September 8, 2009
INVENTOR(S) : Mark Brown et al.

It is certified that error appears in the above-identified patent and that said Letters Patent is hereby corrected as shown below:

Title page, item (75) should read as follows:

(75) Inventors: Mark Brown, Bellefontaine, OH (US);
Marc Iman, Plain City, OH (US);
Cindy Tran, Plain City, OH (US);
James Ritchie, Columbus, OH (US);
Takahiro Ohno, Wako (JP);
Takashi Ogawa, Wako (JP);
Takeshi Ishikawa, Wako (JP)

Signed and Sealed this

Tenth Day of November, 2009

David J. Kappos

David J. Kappos
*Director of the United States Patent and Trademark Office*